(12) United States Patent
Ohta

(10) Patent No.: US 8,760,702 B2
(45) Date of Patent: Jun. 24, 2014

(54) DEVICE COOPERATION SYSTEM, IMAGE FORMING APPARATUS, FUNCTION PROVIDING METHOD

(75) Inventor: Shingo Ohta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/604,244

(22) Filed: Sep. 5, 2012

(65) Prior Publication Data

US 2013/0057917 A1    Mar. 7, 2013

(30) Foreign Application Priority Data

Sep. 7, 2011    (JP) .................................. 2011-194976

(51) Int. Cl.
G06F 3/12    (2006.01)
(52) U.S. Cl.
USPC ........................................................ 358/1.15
(58) Field of Classification Search
None
See application file for complete search history.

(56) References Cited

U.S. PATENT DOCUMENTS

| | | | | |
|---|---|---|---|---|
| 4,839,829 A | * | 6/1989 | Freedman ...................... | 715/751 |
| 5,557,416 A | * | 9/1996 | Sasanuma et al. ............ | 358/300 |
| 6,396,594 B1 | * | 5/2002 | French et al. ................ | 358/1.18 |
| 6,748,100 B2 | * | 6/2004 | Herley et al. ................. | 382/135 |
| 7,002,710 B1 | * | 2/2006 | Van Liew et al. ............ | 358/3.28 |
| 7,733,530 B2 | * | 6/2010 | Ryan et al. .................... | 358/1.9 |
| 8,379,237 B2 | * | 2/2013 | Tominaga ..................... | 358/1.13 |
| 2005/0151992 A1 | * | 7/2005 | Shaw et al. ................... | 358/1.14 |

FOREIGN PATENT DOCUMENTS

| | | |
|---|---|---|
| JP | 2007-081955 | 3/2007 |
| JP | 2010-072760 | 4/2010 |
| JP | 2010-074431 | 4/2010 |
| JP | 2010-218262 | 9/2010 |

* cited by examiner

Primary Examiner — Jeremiah Bryar
(74) Attorney, Agent, or Firm — Harness, Dickey & Pierce, P.L.C.

(57) ABSTRACT

A device cooperation system includes a first device including an acquiring unit for acquiring image data, an output condition receiving unit for receiving output conditions used by the first and second devices when outputting the image data, a first important document determining unit for determining whether first important information is included in the image data, a first operation information recording unit for recording operation information of a first output unit when it is determined that the first important information is included in the image data, and a second device including a second operation information recording unit for recording operation information of a second output unit when the determination result indicating that the first important information is included in the image data is acquired from the first device.

11 Claims, 39 Drawing Sheets

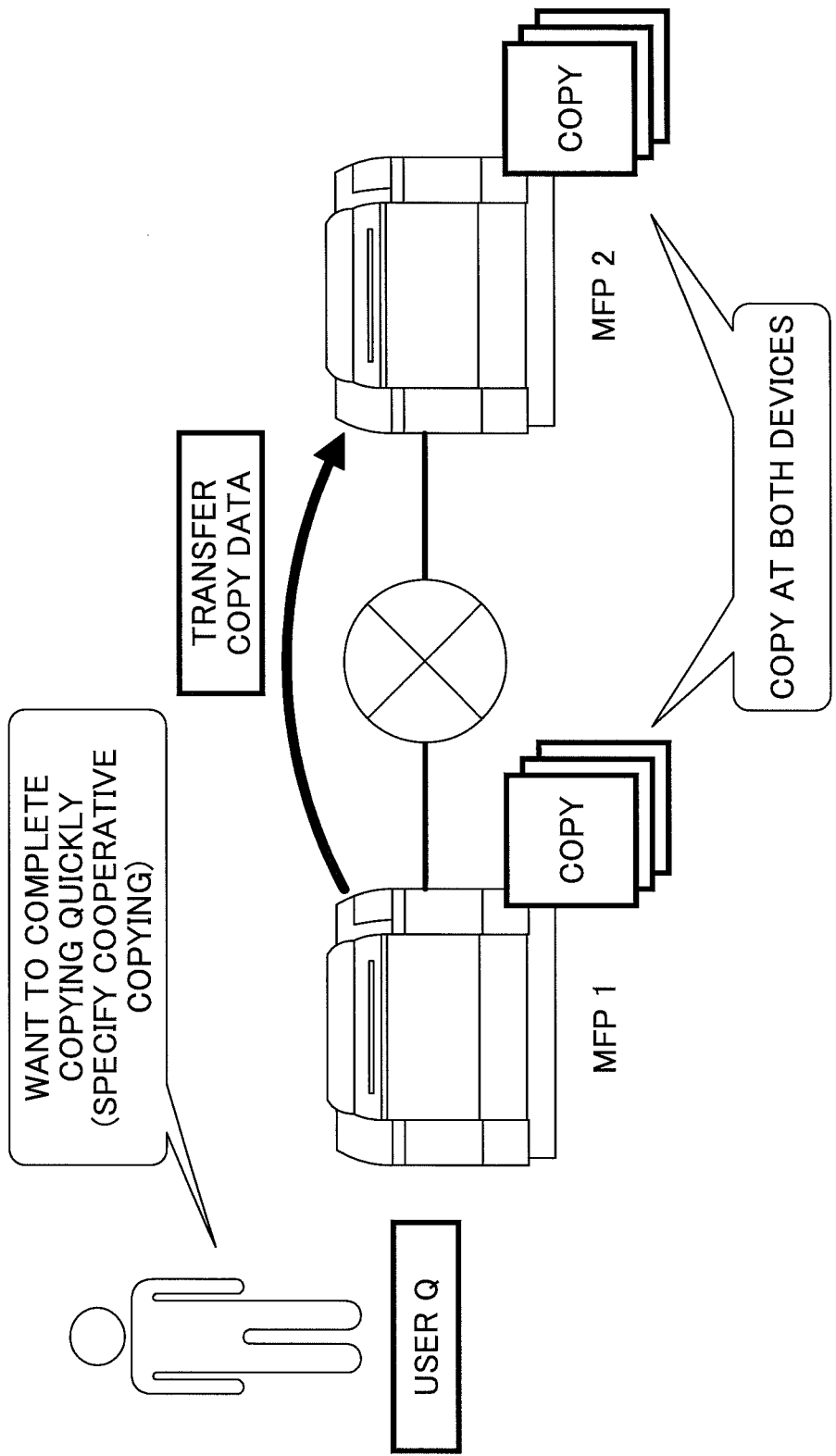

FIG.4A

COPY APPLICATION

| SCAN ORIGINAL WITH SCANNER | IMAGE PROCESSING | PRINTING | POST-PROCESSING |
|---|---|---|---|
| MFP 1 | – | MFP 2 | MFP THAT PERFORMED PRINTING |
| MFP 1 | – | MFP 1, MFP 2 | 〃 |
| MFP 1 | MFP 1 | MFP 2 | 〃 |
| MFP 1 | MFP 2 | MFP 2 | 〃 |
| MFP 1 | MFP 1 | MFP 1, MFP 2 | 〃 |
| MFP 1 | MFP 2 | MFP 1, MFP 2 | 〃 |

FIG.4B

SCANNER APPLICATION

| SCAN ORIGINAL WITH SCANNER | IMAGE PROCESSING | TRANSMIT |
|---|---|---|
| MFP 1 | — | MFP 2 E-MAILS, SENDS TO FOLDER |
| MFP 1 | MFP 1 | MFP 2 E-MAILS, SENDS TO FOLDER |
| MFP 1 | MFP 2 | MFP 2 E-MAILS, SENDS TO FOLDER |
| MFP 1 | MFP 2 | MFP 1 E-MAILS, SENDS TO FOLDER |

FIG.4C

FAX TRANSMISSION APPLICATION

| SCAN ORIGINAL WITH SCANNER | IMAGE PROCESSING | FAX TRANSMISSION |
|---|---|---|
| MFP 1 | – | MFP 2 PERFORMS FAX TRANSMISSION |
| MFP 1 | MFP 1 | MFP 2 PERFORMS FAX TRANSMISSION |
| MFP 1 | MFP 2 | MFP 2 PERFORMS FAX TRANSMISSION |
| MFP 1 | MFP 2 | MFP 1 PERFORMS FAX TRANSMISSION |

FIG.4D (NONE)

| STORING MFP | IMAGE PROCESSING | SCAN |
|---|---|---|
| MFP 2 | – | MFP 1 READS AND PRINTS, ETC. |
| MFP 2 | MFP 1 or 2 | MFP 1 READS AND PRINTS, ETC. |

FIG.8

| USER NAME | | USER Q | | | |
|---|---|---|---|---|---|
| USER ID | | 123456 | | | |
| LOG-IN NAME | | q_xxxx | | | |
| PASSWORD | | q_yyyy | | | |
| | | COPY | | FAX | PRINT |
| UPPER LIMIT USAGE AMOUNT | COLOR | 50 | | 100 | 50 |
| | MONOCHROME | 100 | | | 100 |
| USAGE AMOUNT | COLOR | 10 | | 22 | 32 |
| | MONOCHROME | 32 | | | 54 |
| POSSIBLE USAGE AMOUNT | COLOR | 40 | | 78 | 18 |
| | MONOCHROME | 68 | | | 46 |

| | FUNCTION | | |
|---|---|---|---|
| SCAN | COLOR/BLACK-AND-WHITE/TWO-COLOR/MONOCHROME | | |
| | CHARACTERS/PHOTOGRAPH/CHARACTERS AND PHOTOGRAPH | | |
| | RESOLUTION 100~600dpi | | |
| EDIT | COMBINE 2in1/4in1/8in1 | | |
| | STAMP PRINTING | | |
| | COPY GUARD | | |
| | MAGNIFICATION 25~200% | | |
| | OCR | | |
| | PDF CONVERSION | | |
| OUTPUT | FAX | ACCUMULATION TRANSMISSION | |
| | PRINTING | PRINTING SPEED 60/MIN. | |
| | | COLOR/BLACK-AND-WHITE/TWO-COLOR/MONOCHROME | |
| | | SHEET SIZE AUTOMATIC/A4/B4/A3 | |
| | | POWER CONSUMPTION MONOCHROME 10W/h COLOR 40W/h STAND UP 1000W/h | |
| | | STAPLING | |
| | | PUNCHING | |
| | | Z-FOLDING | |

FIG.9

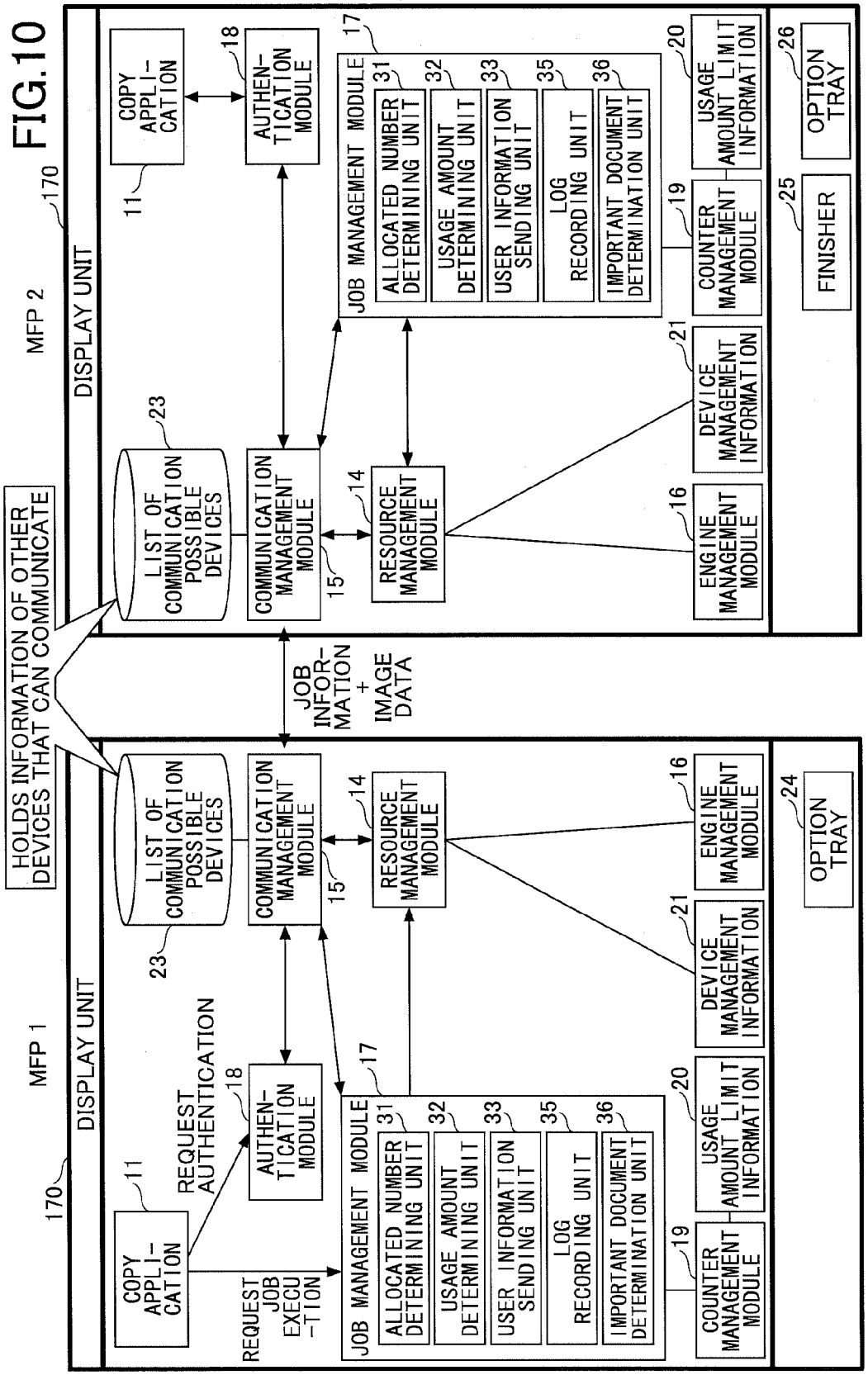

FIG.11A

| DEVICE COOPERATION-USE MFP |
|---|
| 192.168.11.100 (MFP 2) |
| 192.168.11.101 (MFP 3) |
| 192.168.11.102 (SERVER 1) |
| 192.168.12.100 (MFP 4) |
| 192.168.12.101 (SERVER 2) |

FIG.11B

| COMMUNICATION POSSIBLE DEVICES |
|---|
| 192.168.11.100 (MFP 2) |
| 192.168.11.101 (MFP 3) |
| 192.168.11.102 (SERVER 1) |
| – |
| 192.168.12.101 (SERVER 2) |

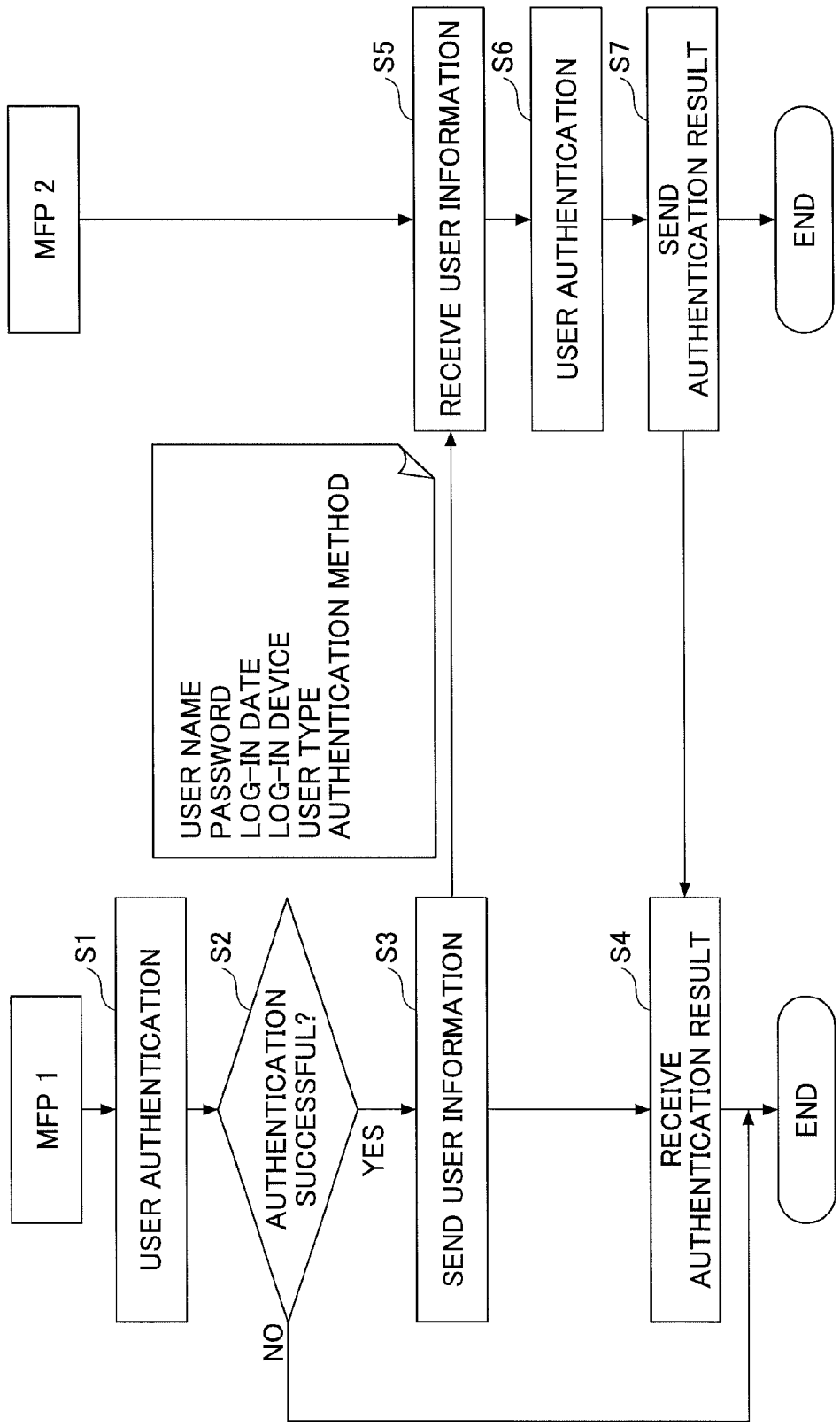

FIG.14A

COOPERATION JOB-PRINT SETTING — SCAN SETTING — 325
EDIT SETTING — 324

● COMMON SETTING ⇒ COMMON PRINT CONDITIONS CAN BE SET IN DEVICE

PLEASE SELECT DEVICE

| OWN DEVICE 250W·h | IMAGICS 500W·h | IPUKS 120W·h |

○ SEPARATE SETTINGS ⇒ PRINT CONDITIONS CAN BE SET FOR EACH DEVICE

COOPERATION JOB-PRINT SETTING — SCAN SETTING
COMMON SETTING — EDIT SETTING

PLEASE SET PRINT CONDITIONS

COLOR/BLACK-AND-WHITE: COLOR | BLACK-AND-WHITE | TWO-COLOR | MONOCHROME

SHEET SIZE: AUTOMATIC | A4 | A3 | B4

NUMBER OF COPIES: 5 COPIES

MAGNIFICATION | SORT | STAPLE

EXECUTE

FIG.14C

COOPERATION JOB-PRINT SETTING — SCAN SETTING
SEPARATE SETTINGS — EDIT SETTING

PLEASE SET PRINT CONDITIONS

OWN DEVICE | IMAGICS | IPUKS

COLOR/BLACK-AND-WHITE: COLOR | BLACK-AND-WHITE | TWO-COLOR | MONOCHROME

SHEET SIZE: AUTOMATIC | A4 | A3 | B4

NUMBER OF COPIES: 1 COPIES

MAGNIFICATION | SORT | STAPLE

EXECUTE

FIG.15A

| # | | DEVICE IN CHARGE | INPUT/EDIT/OUTPUT CONDITIONS | | | | |
|---|---|---|---|---|---|---|---|
| 1 | INPUT | MFP 1 | SINGLE-SIDED SCANNING | CHARACTERS | 300dpi | | BLACK-AND-WHITE |
| 2 | EDIT | MFP 2 | 4in1 | | | | |
| 3 | OUTPUT | MFP 1 | MONOCHROME | | 5 COPIES | A4 | PUNCH |

FIG.15B

| # | | DEVICE IN CHARGE | INPUT/EDIT/OUTPUT CONDITIONS | | | | |
|---|---|---|---|---|---|---|---|
| 1 | INPUT | MFP 1 | SINGLE-SIDED SCANNING | CHARACTERS | 300dpi | | BLACK-AND-WHITE |
| 2 | EDIT | MFP 2 | 4in1 | | | | |
| 3 | OUTPUT | MFP 1, MFP 2 | MONOCHROME | | 5 COPIES | A4 | PUNCH |

FIG.15C

| # | | DEVICE IN CHARGE | INPUT/EDIT/OUTPUT CONDITIONS | | | | |
|---|---|---|---|---|---|---|---|
| 1 | INPUT | MFP 1 | SINGLE-SIDED SCANNING | CHARACTERS | 300dpi | | BLACK-AND-WHITE |
| 2 | EDIT | MFP 2 | 4in1 | | | | |
| 3 | OUTPUT | MFP 1 | MONOCHROME | | 3 COPIES | A4 | PUNCH |
| 3 | OUTPUT | MFP 2 | MONOCHROME | | 2 COPIES | A4 | PUNCH |

| | | DEVICE IN CHARGE | INPUT/EDIT/OUTPUT CONDITIONS | | |
|---|---|---|---|---|---|
| 1 | INPUT | MFP 1 | SINGLE-SIDED SCANNING | CHARACTERS 300dpi | BLACK-AND-WHITE |
| 2 | EDIT | MFP 1 | 120% | | |
| 3 | OUTPUT | MFP 1, MFP 2 | 03-1234-5678<br>03-1234-5679 | | |

| | | DEVICE IN CHARGE | INPUT/EDIT/OUTPUT CONDITIONS | | |
|---|---|---|---|---|---|
| 1 | INPUT | MFP 1 | SINGLE-SIDED SCANNING | CHARACTERS 300dpi | BLACK-AND-WHITE |
| 2 | EDIT | MFP 1 | 120% | | |
| 3 | OUTPUT | MFP 1 | 03-1234-5678 | | |
| 3 | OUTPUT | MFP 2 | 03-1234-5679 | | |

FIG.17

MFP 1

| LOG ID | | | 001 |
|---|---|---|---|
| JOB EXECUTION RESULT | | | OK |
| START TIME | | | 10:00 |
| END TIME | | | 10:02 |
| USER NAME (USER ID) | | | USER Q (ABC) |
| OPERATION SOURCE INFORMATION | | | OPERATION PANEL |
| DEVICE COOPERATION | COOPERATION LOG ID | | 123 |
| | EXECUTION RESULT | | OK |
| | MASTER | | 192.168.11.99 (MFP 1) |
| | DEVICE COOPERATION | | SCAN<br>192.168.11.99 (MFP 1)<br>EDIT<br>192.168.11.100 (MFP 2)<br>OUTPUT<br>192.168.11.99 (MFP 1)<br>192.168.11.100 (MFP 2) |
| APPLICATION TYPE | | | COPY APPLICATION |
| EXECUTION CONDITION | SCANNING CONDITION | SINGLE-SIDED/DOUBLE-SIDED | SINGLE-SIDED |
| | | COLOR | BLACK-AND-WHITE |
| | | NUMBER OF PAGES OF DOCUMENT | 50 SHEETS |
| | | NUMBER OF PAGES | 50 PAGES |
| | | TYPE OF ORIGINAL DOCUMENT | CHARACTER |
| | | RESOLUTION | 300dpi |
| | | DENSITY | AUTOMATIC |
| | PRINTING CONDITION | NUMBER OF COPIES | 3 |
| | | SHEET SIZE | A4 |
| | | COLOR SETTING | BLACK-AND-WHITE |
| | | DOUBLE-SIDED/SINGLE-SIDED | SINGLE-SIDED |
| | | STAPLE | YES |
| | | PUNCH POSITION | NO |

FIG.18A

MFP 2

| LOG ID | | 012 |
|---|---|---|
| JOB EXECUTION RESULT | | OK |
| START TIME | | 10:00 |
| END TIME | | 10:02 |
| USER NAME (USER ID) | | USER Q (ABC) |
| OPERATION SOURCE INFORMATION | | 192.168.11.99(MFP 1) |
| DEVICE COOPERATION | COOPERATION LOG ID | 123 |
| | MASTER | 192.168.11.99(MFP 1) |
| APPLICATION TYPE | | COOPERATION |
| | SINGLE-SIDED/DOUBLE-SIDED | 4in1 |

FIG.18B

MFP 2

| LOG ID | | 013 |
|---|---|---|
| JOB EXECUTION RESULT | | OK |
| START TIME | | 10:00 |
| END TIME | | 10:02 |
| USER NAME (USER ID) | | USER Q (ABC) |
| OPERATION SOURCE INFORMATION | | 192.168.11.99(MFP 1) |
| DEVICE COOPERATION | COOPERATION LOG ID | 123 |
| | MASTER | 192.168.11.99(MFP 1) |
| APPLICATION TYPE | | COOPERATION |
| EXECUTION CONDITION | NUMBER OF COPIES | 2 |
| | SHEET SIZE | A4 |
| | COLOR SETTING | BLACK-AND-WHITE |
| | SINGLE-SIDED/DOUBLE-SIDED | SINGLE-SIDED |
| | STAPLE | YES |
| | PUNCH POSITION | NO |

DEVICE COOPERATION SYSTEM, IMAGE FORMING APPARATUS, FUNCTION PROVIDING METHOD

BACKGROUND OF THE INVENTION

1. Field of the Invention

The present invention relates to a device cooperation system in which plural devices connected via a network take partial charge of providing functions of the devices.

2. Description of the Related Art

There is known a processing format referred to as device cooperation, by which plural devices connected in a network cooperate with each other to execute a single job (see, for example, Patent Document 1). Device cooperation means, for example, that plural devices take partial charge of providing functions necessary for a single job constituted by a series of processes starting from input to output.

FIG. 1 illustrates an example of executing a job by device cooperation. An MFP (multifunction peripheral) 1 and an MFP 2 are connected to each other via a network. The MFP 1 does not have a fax function, but the MFP 2 has a fax function. A user Q wants to transmit image data by fax, but because the MFP 1 does not have a fax function, the user Q uses the MFP 1 to scan an original document by the scanner function, and uses the fax function of the MFP 2 to transmit the image data by fax.

FIG. 2 illustrates another example of executing a job by device cooperation. Both the MFP 1 and the MFP 2 have a printing function. The user Q wants to print out plural copies of the image data. The printing operation can be done with only the MFP 1; however, by having the MFP 2 take partial charge of the printing operation, the printing operation can be completed quickly. The user Q may operate the MFP 1 to scan the original document with the scanning function, and transmit the image data and print conditions to the MFP 2, so that the printing operation is shared by the MFP 1 and the MFP 2.

In the conventional technology, when a single MFP executes a job, or when a predetermined operation is received, the MFP records a log. The log is for recording which user executed what kind of job, or which user performed an operation. For example, when a copy of a large volume document is taken, it is possible to identify the user. In some companies and government offices, MFPs are installed on condition that they have a function of recording logs.

However, even if the data size of a log is not that large, when the MFP continuously records a log, it becomes difficult to secure a storage area for a log. Furthermore, even when the same logs as those of the conventional technology are used, more detailed information is increasingly being recorded, and jobs and operations that have not been conventionally recorded are increasingly being recorded. Even if a large storage capacity is secured for the log, if the data amount of the log is large, the time for searching increases, which deteriorates the convenience when utilizing the log.

Therefore, some MFPs have a function with which the user can select the log to be recorded. For example, the user can switch the ON/OFF state of recording a log, depending on the application, such as a copy application, a scanner application, and a fax application, or according to operations such as changing the setting and accessing a resource.

However, in the conventional settings, it is only possible to make a setting for choosing between two options, e.g., always record a log when making copies, or never record a log when making copies. Thus, in order to reduce the amount of recorded logs, the only option is to turn off the function of recording logs. Therefore, it would be meaningless to install a log function.

Furthermore, in a device cooperation system, when both the MFP 1 and the MFP 2 record a log, the storage area of the log is simply doubled in the entire device cooperation system. Furthermore, in the conventional device cooperation system, there has been no consideration made with respect to the technology of recording logs appropriately.

Patent Document 1: Japanese Laid-Open Patent Publication No. 2010-074431

SUMMARY OF THE INVENTION

The present invention provides a device cooperation system, an image forming apparatus, and a function providing method, in which one or more of the above-described disadvantages are eliminated.

A preferred embodiment of the present invention provides a device cooperation system, an image forming apparatus, and a function providing method, in which the recorded log can be reduced.

According to an aspect of the present invention, there is provided a device cooperation system including plural devices connected via a network, which take partial charge of providing a function of the plural devices, wherein a first device includes an acquiring unit configured to acquire image data that is an output target, an output condition receiving unit configured to receive a first output condition used by the first device and a second output condition used by an at least one second device when outputting the image data, a first important document determining unit configured to determine whether first important information determined in advance is included in the image data, a first operation control unit configured to control an output operation of the first device based on the first output condition and send an output request to the at least one second device, a first output unit configured to output an output object according to the first output condition of the first device, a first operation information recording unit configured to record operation information of the first output unit when the first important document determining unit determines that the first important information is included in the image data, and a data communication unit configured to send, to the at least one second device, the image data, a determination result indicating whether the first important information is included in the image data, and the second output condition of the at least one second device, and the at least one second device includes a second operation control unit configured to control an output operation of the at least one second device in response to receiving the output request from the first device, a second output unit configured to output an output object according to the second output condition of the at least one second device, and a second operation information recording unit configured to record operation information of the second output unit when the determination result indicating that the first important information is included in the image data is acquired from the first device.

According to an aspect of the present invention, there is provided an image forming apparatus connected to a device via a network, the device including a second operation control unit configured to control an output operation in response to receiving an output request from the image forming apparatus, a second output unit configured to output an output object according to a second output condition, and a second operation information recording unit configured to record operation information of the second output unit when a determination result indicating that first important information is included in image data is acquired from the image forming apparatus, the image forming apparatus including an acquiring unit configured to acquire the image data that is an output target; an output condition receiving unit configured to receive a first output condition used by the image forming apparatus and the second output condition used by the device when outputting the image data; a first important document determining unit configured to determine whether the first important information determined in advance is included in the image data; a first operation control unit configured to control an output operation of the image forming apparatus based on the first output condition and send an output request to the device; a first output unit configured to output an output object according to the first output condition; a first operation information recording unit configured to record operation information of the first output unit when the first important document determining unit determines that the first important information is included in the image data; and a data communication unit configured to send, to the device, the image data, a determination result indicating whether the first important information is included in the image data, and the second output condition of the device.

According to an aspect of the present invention, there is provided a function providing method by which plural devices connected via a network take partial charge of providing a function of the plural devices, the function providing method including acquiring image data that is an output target, performed by an acquiring unit of a first device; receiving a first output condition used by the first device and a second output condition used by an at least one second device when outputting the image data, performed by an output condition receiving unit of the first device; determining whether first important information determined in advance is included in the image data, performed by a first important document determining unit of the first device; controlling an output operation of the first device based on the first output condition and sending an output request to the at least one second device, performed by a first operation control unit of the first device; outputting an output object according to the first output condition of the first device, performed by a first output unit of the first device; recording operation information of the first output unit when the first important document determining unit determines that the first important information is included in the image data, performed by a first operation information recording unit of the first device; sending, to the at least one second device, the image data, a determination result indicating whether the first important information is included in the image data, and the second output condition of the at least one second device, performed by a data communication unit of the first device; controlling an output operation of the at least one second device in response to receiving the output request from the first device, performed by a second operation control unit of the at least one second device; outputting an output object according to the second output condition of the at least one second device, performed by a second output unit of the at least one second device; and recording operation information of the second output unit when the determination result indicating that the first important information is included in the image data is acquired from the first device, performed by a second operation information recording unit of the at least one second device.

BRIEF DESCRIPTION OF THE DRAWINGS

Other objects, features and advantages of the present invention will become more apparent from the following detailed description when read in conjunction with the accompanying drawings, in which:

FIG. 2 illustrates another example of executing a job by device cooperation;

FIGS. 4A through 4D illustrate examples of formats of device cooperation of the MFP 1 and the MFP 2 in respective applications;

FIG. 8 illustrates an example of usage amount limit information;

FIG. 9 illustrates an example of device management information;

FIG. 10 illustrates the relationship between blocks when the MFP 1 and MFP 2 perform device cooperation;

FIGS. 11A and 11B illustrate an example of a list of communication possible devices;

FIG. 12 is an example of a flowchart indicating procedures performed by the MFP 1 and the MFP 2 for authenticating a user Q;

FIGS. 14A through 14C illustrate an example of a menu of a device cooperation job displayed on a display unit;

FIGS. 15A through 15E illustrate an example of job information;

FIG. 17 illustrates an example of log data;

FIGS. 18A and 18B illustrate an example of log data;

DETAILED DESCRIPTION OF THE PREFERRED EMBODIMENTS

A description is given, with reference to the accompanying drawings, of embodiments of the present invention.

First Embodiment

Figure 1:
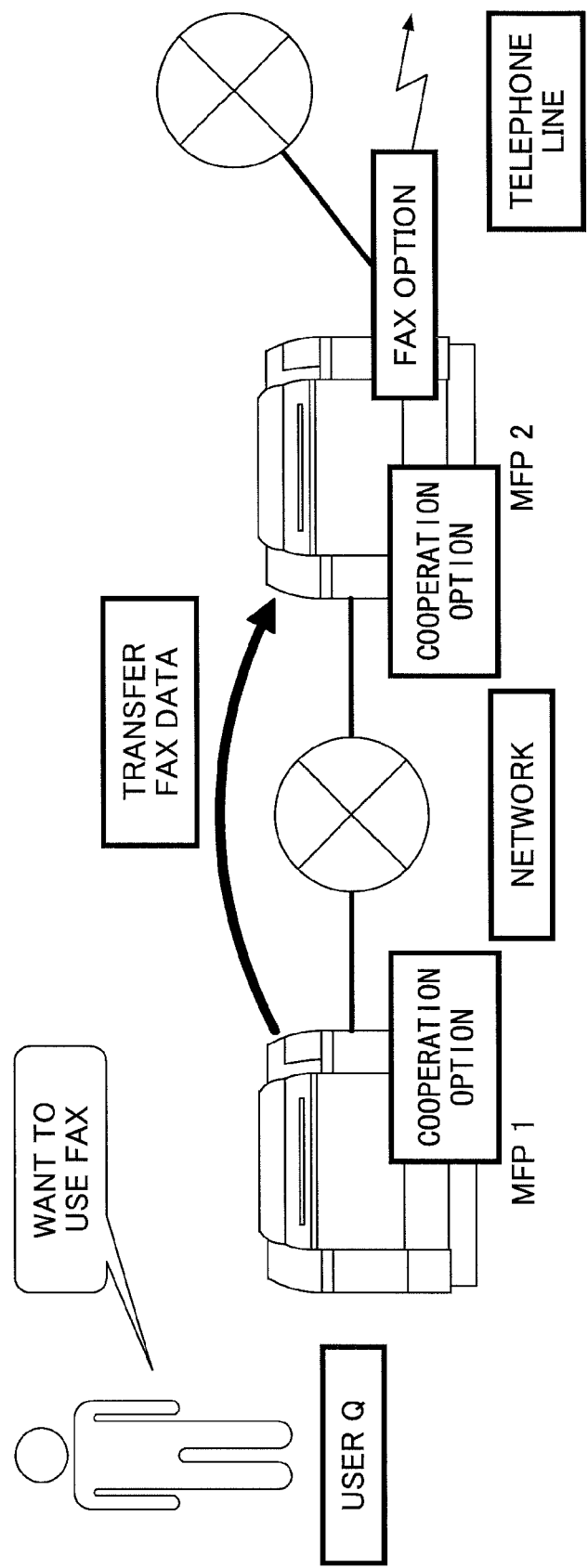
FIG. 1 illustrates an example of executing a job by device cooperation.
Figure 3A:
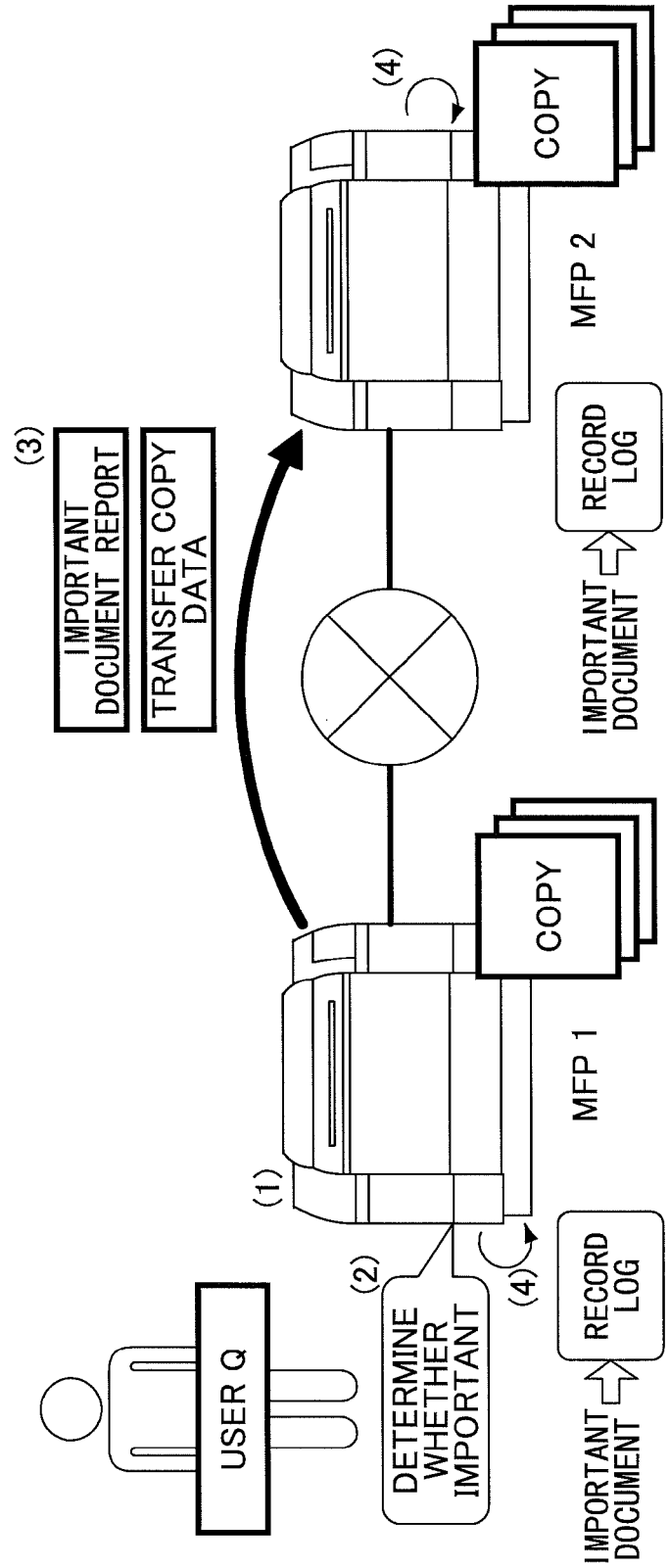
FIGS. 3A through 3C schematically illustrate procedures of a device cooperation job of a copy application executed by the MFP 1 and the MFP 2.
Figure 3B:
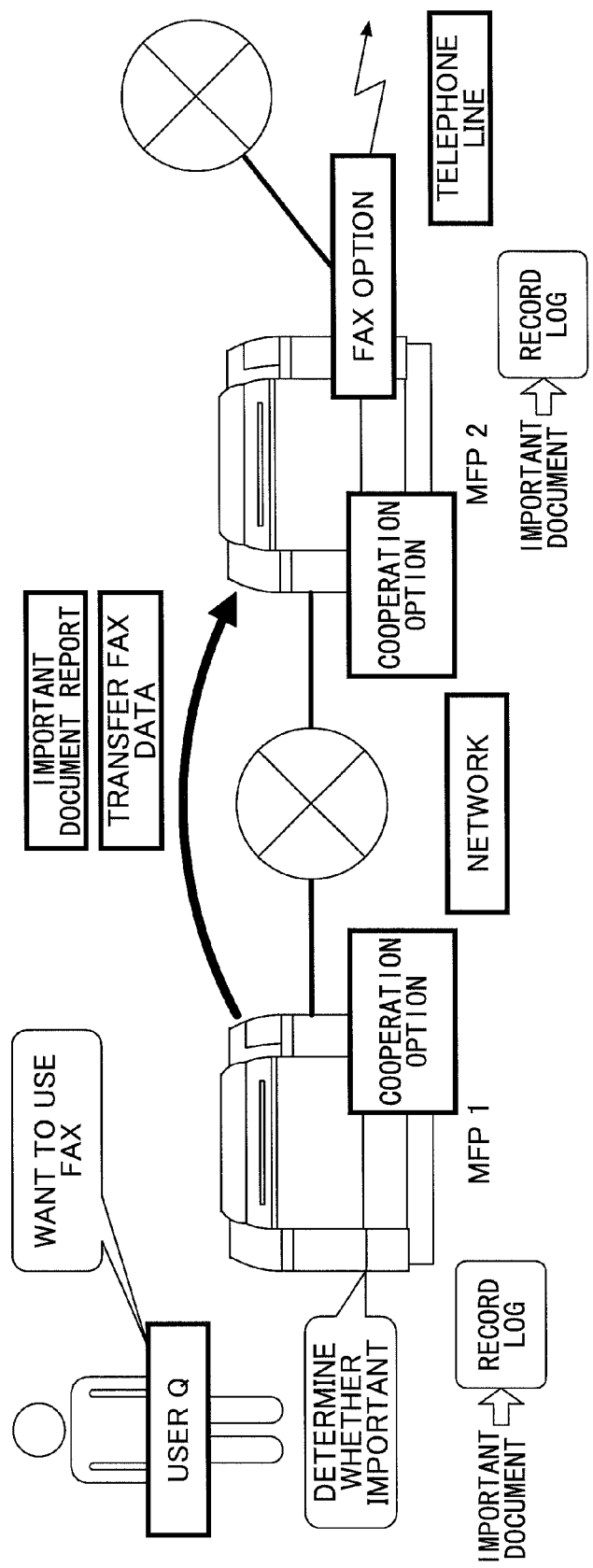
Figure 3C:
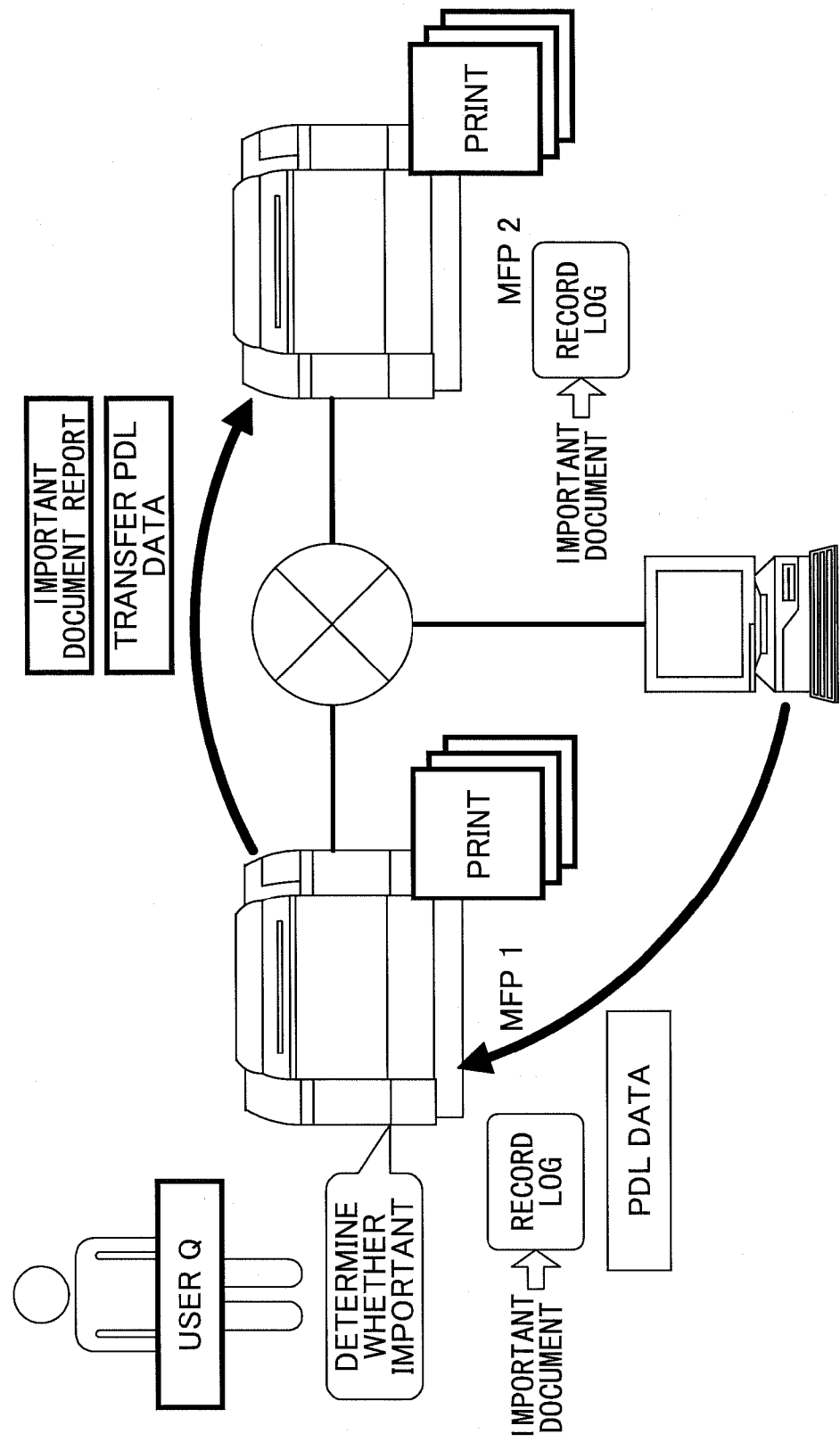

FIGS. 3A through 3C schematically illustrate a device cooperation system 200 according to the present embodiment. An MFP (multifunction peripheral) 1 and an MFP 2 (hereinafter, referred to as "MFP 100" when not distinguished from each other) can execute a single job by cooperating with each other. This system in which plural devices provide functions to each other is referred to as the device cooperation system 200. A job that is executed by two or more MFPs in cooperation with each other is referred to as a device cooperation job.

FIG. 3A schematically illustrates procedures performed by the MFP 1 and the MFP 2 for executing a device cooperation job of a copy application.

(1) The user Q operates the MFP 1, and sets conditions for executing a device cooperation job to perform printing with the MFP 1 and the MFP 2.

(2) The MFP 1 analyzes the image data of the scanned original document, and determines whether the document is an important document.

(3) When the document is an important document, the MFP 1 sends an important document report to the MFP 2.

(4) The MFP 1 and the MFP 2 respectively print out the allocated page numbers.

(5) Then, the MFP 1 records a log only when the document is determined as an important document. Furthermore, the MFP 2 records a log only when an important document report is received.

The MFPs 1 and 2 record a log only when the document is an important document, and therefore the storage amount of the log can be reduced. Even if the data size of the log is doubled in the case of device cooperation, if the possibility that the document is an important document is less than or equal to 50%, the storage amount of the log can be reduced compared to the case where a single MFP records a log.

FIG. 3B schematically illustrates procedures performed by the MFP 1 and the MFP 2 for executing a device cooperation job of a fax application. The same processing procedures as above are performed in the case of a fax application.

That is to say, the MFP 1 determines whether the document to be transmitted is an important document, and when the document is an important document, the MFP 1 sends an important document report to the MFP 2.

The MFP 1 does not perform fax transmission, and therefore it can be set as to whether the MFP 1 is to record a log. In the present embodiment, the MFPs 1 and 2 record a log of a device cooperation job in which fax transmission is performed by device cooperation.

FIG. 3C schematically illustrates procedures performed by the MFP 1 and the MFP 2 for executing a device cooperation job of a printer application. In the case of a printer application, the same processing procedures as above are performed, except that the MFP 1 acquires PDL data from a PC (Personal Computer).

That is to say, the MFP 1 determines whether the PDL data to be transmitted is an important document, and when the document is an important document, the MFP 1 sends an important document report to the MFP 2. When the document is determined as an important document, the MFPs 1 and 2 record a log of a device cooperation job in which printing is performed by device cooperation.

Device Cooperation

A description is given of device cooperation. Device cooperation includes all formats where one MFP uses the function of the other MFP. That is to say, cases in which a job is not executed or an application is not operating are also referred to as device cooperation. However, the MFP 1 and the MFP 2 often operate for each application, and therefore a description is given by taking an application as an example. In the description, it is assumed that the device operated by the user is the MFP 1.

The application identifies a combination of one of the plural input units of the MFP and one of the plural output units of the MFP, and controls devices and provides functions based on the identified combination.

FIGS. 4A through 4D illustrate examples of formats of device cooperation of the MFP 1 and the MFP 2. FIGS. 4A through 4D illustrate a copy application, a scanner application, and a transmission application; however, other applications may also be implemented by having the MFP 1 and the MFP 2 provide functions to each other. In the copy application, a single job goes through the processes of scanning an original document by a scanner function, image processing, printing, and post-processing (finishing). Image processing is, for example, OCR processing and confidential print processing. Post-processing is, for example, hole punching and stapling. These processes are not frequently used.

In the scanner application, a single job goes through the processes of scanning an original document by a scanner function, image processing, and transmitting. The image processing is, for example, OCR processing, PDF conversion, and encryption processing. These processes are not frequently used. Transmission includes the processes of, for example, transmitting by email or transmitting to a folder of the user Q.

In the transmission application, a single job goes through the processes of scanning an original document by a scanner function, image processing, and fax transmission. Image processing is, for example, OCR processing and confidential print processing. These processes are not frequently used. Fax transmission is, for example, fax transmission using a telephone line or an IP network.

Furthermore, as described above, device cooperation may be performed without executing a device cooperation job. In this case, the user Q may input instructions in the MFP 1 to read the image data stored in the MFP 2 from the MFP 1 and process the image data. The process may include printing, email transmission, and fax transmission. Furthermore, the process may include deleting image data of the MFP 2 by the MFP 1, and displaying a preview of image data of the MFP 2 by the MFP 1. As described above, even if the MFP 1 and the MFP 2 do not execute a device cooperation job, a format of device cooperation is created.

Furthermore, FIGS. 4A through 4D describe device corporation of two MFPs; however, there may be cases where three or more MFPs perform device cooperation. In the case of device cooperation performed by three or more MFPs, combinations of MFPs taking charge of editing and outputting increase.

Configuration Example

Figure 5:
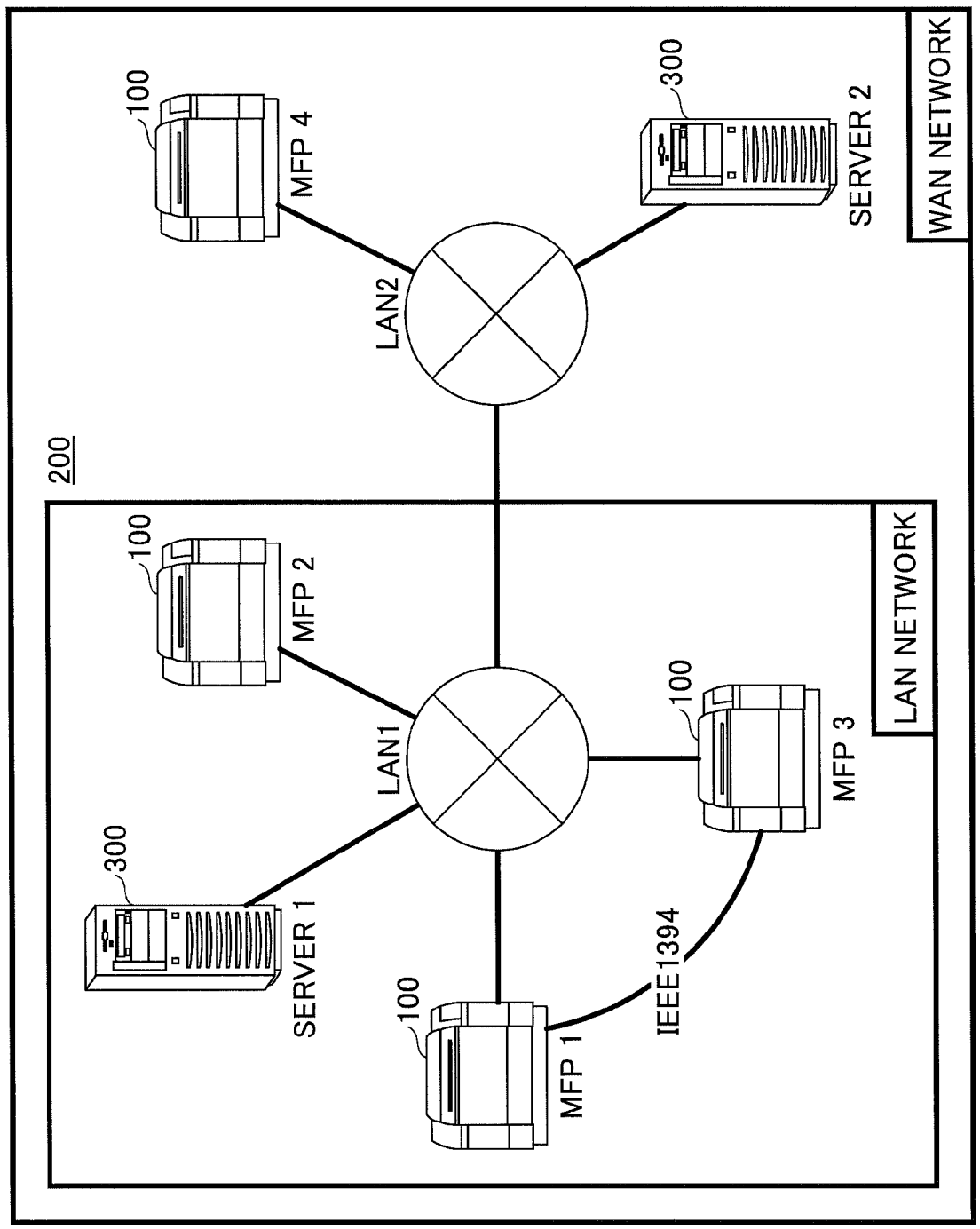
FIG. 5 illustrates a configuration of a device cooperation system.

FIG. 5 illustrates a configuration of the device cooperation system 200. A LAN 1 and a LAN 2 form a single WAN. The LAN 1 and the LAN 2 are connected by an L3 switch or a router (not shown). Device cooperation may be performed when the number of LANs may be one or three or more. Communications among the MFP 1 through MFP 4, communications between servers 1 and 2, and communications between the MFP 1 through MFP 4 and a server 300 (hereinafter, referred to as server 1 or 2 when distinguished) may be wired or wireless.

To the LAN 1, three MFPs 1 through 3 and a server 1 are connected. To the LAN 2, the MFP 4 and the server 2 are connected. The MFPs 1 through 4 have at least one function among copying, scanning, fax transmission, and printing. The MFPs 1 through 4 do not need to have the same functions.

Furthermore, the MFPs 1 through 4 may respectively have functions unique to themselves.

The servers 1 and 2 may be, for example, an information processing apparatus for user authentication or an information processing apparatus for providing functions that the MFPs 1 through 4 do not have (for example, OCR processing, translation processing, and converting file formats), although the servers 1 and 2 are not necessary. Furthermore, in the present embodiment, each MFP has usage amount limit information; however, when the server stores the usage amount limit information of each user, the server 1 or 2 is used. The server 1 or 2 not only compares the possible usage amounts of the respective MFPs, but may also compare the total usage amount that the user users the MFPs 1 through 4 with the usage amount limit information.

Furthermore, in the LAN 1, the MFPs 1 through 3 form a network through a hub or a LAN switch, and the MFP 2 and the MFP 3 are connected by an IEEE1394 interface. As described above, in the device cooperation system 200, one or all of the MFPs may be locally connected (in a peer-to-peer manner). Furthermore, the connection interface may be USB or a LAN cable, as long as communications can be performed between the MFPs. By locally connecting the MFPs, the image data is not transmitted through the LAN 1, 2, and therefore the network load can be reduced. Furthermore, the image data does not flow through the LAN 1, 2, and therefore security is enhanced.

In the device cooperation system 200 illustrated in FIG. 5, the following cooperation formats may be created.

Two or more arbitrary MFPs in the LAN 1 execute a single device cooperation job.

One or more arbitrary MFPs in the LAN 1 and the MFP 4 in the LAN 2 execute a single device cooperation job.

Furthermore, device cooperation may be performed with the use of the servers 1, 2.

Figure 6:
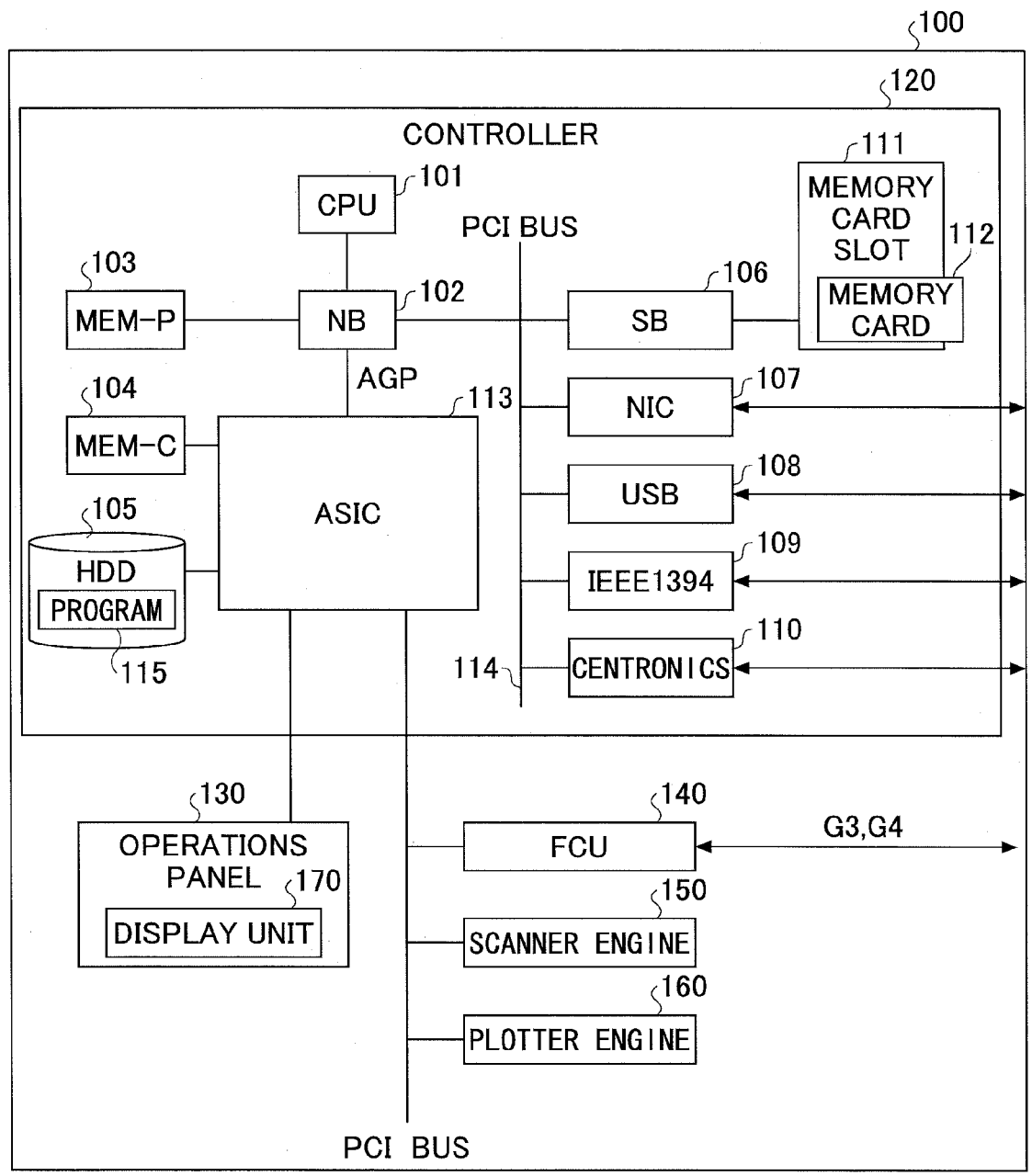
FIG. 6 illustrates a hardware configuration of the MFP 1, 2.

FIG. 6 illustrates a hardware configuration of the MFP 1, 2. The MFP 100 includes a controller 120, an operations panel 130, an FCU (facsimile control unit) 140, a scanner engine 150, and a plotter engine 160.

The controller 120 includes a CPU 101, an ASIC 113, a NB (north bridge) 102, a SB (south bridge) 106, a MEM-P (system memory) 103, a MEM-C (local memory) 104, a HDD (hard disk drive) 105, a memory card slot 111, a NIC (network interface controller) 107, a USB device 108, an IEEE 1394 device 109, and a centronics device 110.

The CPU 101 is an IC for executing various kinds of information processing, and executes programs for providing applications and services in parallel in units of processes, by an OS such as UNIX (registered trademark). The ASIC 113 is an IC for image processing. The NB 102 is a bridge for connecting the CPU 101 and the ASIC 113. The SB 106 is a bridge for connecting the NB 102 with peripheral devices. The ASIC 113 and the NB 102 are connected via an AGP (Accelerated Graphics Port).

The MEM-P 103 is a memory connected to the NB 102. The MEM-C 104 is a memory connected to the ASIC 113. The HDD 105 is a storage connected to the ASIC 113, and is used for storing image data, document data, programs, font data, and form data.

The memory card slot 111 is connected to the SB 106, and is used for setting (inserting) a memory card 112. The memory card 112 is a flash memory such as a USB memory, and is used for distributing a program 115. The program 115 may be distributed by being downloaded from a predetermined server to the MFP 100.

The NIC 107 is a controller for performing data communications using MAC addresses via a network. The USB device 108 is a device for providing a serial port in compliance with the USB specification. The IEEE 1394 device 109 is a device for providing a serial port in compliance with the IEEE 1394 specification. The centronics device 110 is a device for providing a parallel part in compliance with the centronics specification. The NIC 107, the USB device 108, the IEEE 1394 device 109, and the centronics device 110 are connected to the NB 102 and the SB 106 via a PCI (Peripheral Component Interconnect) bus.

The operations panel 130 is a hardware component (operation unit) used by the user Q for inputting information in the MFP 100. The operations panel 130 includes a display unit 170 that is a hardware component for the MFP 100 to provide visible information to the operator. The operations panel 130 is connected to the ASIC 113. The FCU 140, the scanner engine 150, and the plotter engine 160 are connected to the ASIC 113 via the PCI bus 114.

The scanner engine 150 optically scans an original document placed on a contact glass, performs image processing by A/D converting the reflection light from the original document, and generates digital data (hereinafter, image data) having a predetermined resolution.

The plotter engine 160 includes, for example, tandem type photoconductive drums, and forms latent images by modulating laser beams and scanning the photoconductive drums based on image data and PDL data received from a user PC. An image corresponding to one page developed by applying toner to the latent images is transferred to a sheet by heat and pressure. The plotter engine 160 is not limited to a plotter of an electrophotographic type; the plotter engine 160 may be an inkjet type for forming an image by jetting liquid droplets.

The FCU 140 is connected to a network via the NIC 107, and transmits and receives image data by communication procedures according to the specification of T.37, T.38, for example. Alternatively, the FCU 140 is connected to a public communications network, and transmits and receives image data by communication procedures according to when image data is received while the power of the MFP 100 is off, it is possible to activate the plotter engine 160 and print the image data onto a sheet.

Figure 7:
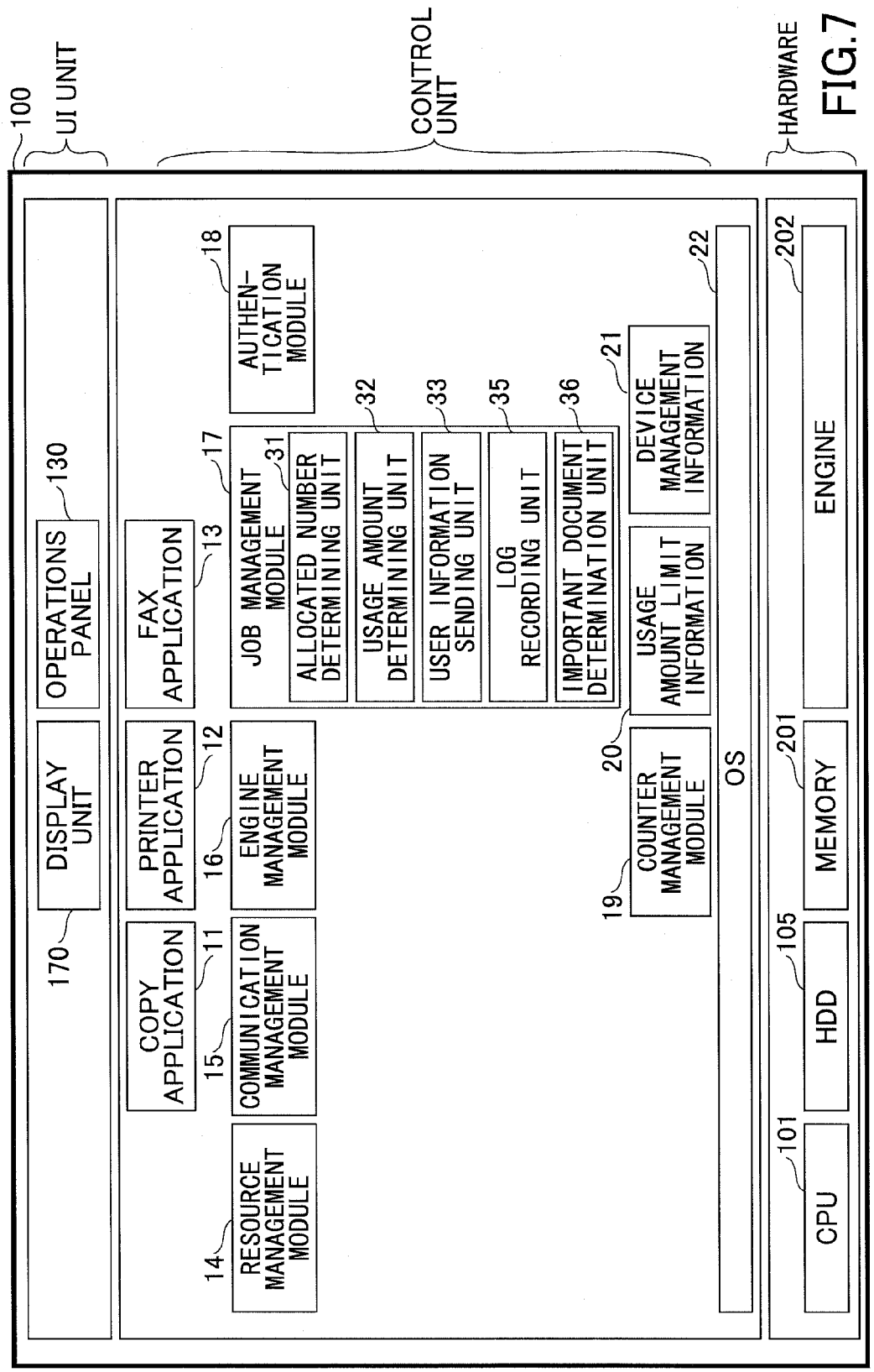
FIG. 7 is a functional block diagram of the MFP.

FIG. 7 is a functional block diagram of the MFP 100. The MFP 100 includes an UI unit, a control unit, and hardware. The UI unit and hardware are described above. A memory 201 corresponds to the MEM-P 103 and the MEM-C 104, an engine 202 corresponds to the FCU 140, the scanner engine 150, and the plotter engine 160.

The control unit includes a copy application 11, a printer application 12, a fax application 13, a resource management module 14, a communication management module 15, an engine management module 16, a job management module 17, an authentication module 18, and a counter management module 19. Furthermore, the HDD 105 stores, for example, usage amount limit information 20 and device management information 21.

The copy application 11, the printer application 12, and the fax application 13 are examples of applications. When the user Q selects a copy button (not shown) by operating the operations panel 130, the copy application 11 starts operating, and when the user Q selects a printer button (not shown) by operating the operations panel 130, the printer application 12 starts operating, and when the user Q selects a fax button (not shown) by operating the operations panel 130, the fax application 13 starts operating. An OS 22 is a general-purpose operating system such as UNIX (registered trademark), and executes modules and software of applications as processes in parallel.

The job management module 17 acquires, from the applications, job information of the device cooperation job set by the user Q, and manages the execution of jobs. Specifically, the job management module 17 requests the resource management module 14 to control resources based on job information, and controls screen display, application management, the operation panel, etc., while receiving the state of progress from the resource management module 14. The job management module 17 detects the present number of output sheets and displays the number on the operations panel 130.

Furthermore, the job management module 17 includes a usage amount determining unit 32, an allocated number determining unit 31, a user information sending unit 33, an important document determination unit 36, and a log recording unit 35, which may be positioned anywhere else in the control unit. The allocated number determining unit 31 allocates usage amounts to the respective cooperation devices within the limitation of the usage amount limit information 20, in a manner that the printing time and power consumption are advantageous. The usage amount is the number of pages in the case of the printer application 12 and the copy application 11, and the usage amount is the number of transmission destinations in the case of the fax application 13. The usage amount determining unit 32 determines whether the scheduled number of pages to be output is less than or equal to the possible usage amount. The user information sending unit 33 sends the user information to the MFP 2 that is to perform the device cooperation job. The important document determination unit 36 determines whether a document is important. The log recording unit 35 records logs. Details of the process are given below.

The resource management module 14 manages resources. When a request to use hardware resources such as the operations panel 130, the FCU 140, the scanner engine 150, the memory 201, the HDD 105, the NIC 107, the USB device 108, the IEEE 1394 device 109, and the centronics device 110 is received from the job management module 17, the resource management module 14 makes adjustments among the applications and controls the applications. Specifically, the resource management module 14 determines whether the requested hardware resource can be used (not used according to another request), and when it can be used, the resource management module 14 reports to the job management module 17 that the requested hardware resource can be used. Furthermore, the resource management module 14 performs usage scheduling of the hardware resource in response to the request from the job management module 17, and controls the engine management module 16.

The engine management module 16 controls the engine according to the usage schedule secured and created by the resource management module 14. Accordingly, the scanner engine, the plotter engine (monochrome line printer, color line printer), and the FCU actually execute the job.

The communication management module 15 is a module for providing a service that can be commonly used with respect to applications that require a network, such as device cooperation. The communication management module 15 assigns, to the respective applications, data received from the network by protocols and transmits data received from the applications to the network. Specifically, the communication management module 15 includes server daemons such as ftpd, httpd, lpd, snmpd, telnetd, and smtpd, and client functions of the same protocol.

The authentication module 18 is a module for performing user authentication. In the usage amount limit information 20 described below, in addition to the possible usage amount for each user, the user name and password are registered. The authentication module 18 authenticates the user Q based on whether the combination of the user name and password input to the operations panel 130 by the user Q is stored in the device cooperation system 200. Alternatively, the authentication module 18 may authenticate the user Q by reading, with an IC card reader (not shown), a user ID stored in an IC card held by the user Q.

When the server 1 or the server 2 functions as an authentication server, the authentication module 18 does not need to be installed in the MFP. A case where the authentication module 18 in each MFP authenticates the user is referred to as "local authentication". A case where the server 1 or the server 2 authenticates the user Q is referred to as "network authentication". The authentication result of local authentication is valid only in the MFP that performed the authentication, but in the case of network authentication, the authentication result is valid in MFPs in the network defined in advance.

The authentication module 18 reports whether authentication is successful to the application. When the authentication is successful, the application receives settings of execution conditions of a job, and when the authentication is unsuccessful, the application displays a message such as "authentication is unsuccessful" on the display unit 170.

The counter management module 19 counts the usage amount, and updates the usage amount in the usage amount limit information 20. A description of the usage amount limit information 20 is given below.

The applications and modules in the control unit are objects having one or more methods, which are executed as processes on the OS 22. The processes are executed in units of one or more threads, and the OS 22 assigns these threads to the CPU. The OS 22 manages the states of the threads (execution state, waiting state, executable state, etc.), and controls the thread to be assigned to the CPU among the threads that are in an executable state, according to a logic such as priority and round-robin. Accordingly, the processing speed of parallel execution is higher than that of parallel execution performed by switching processes. The applications and the modules transmit and receive messages by inter-process communications by executing the method.

Usage Amount Limit Information

FIG. 8 illustrates an example of the usage amount limit information 20. As described above, the usage amount limit information 20 includes user information. In the user information, a "user name", a "user ID", a "log-in name", and a "password" are registered. The "user name" is a name or a nickname by which the user Q can be easily identified. The "user ID" is one or more numbers, symbols, or alphabetical letters, or a combination thereof, whose uniqueness is ensured in the device cooperation system. The "log-in name" is an identification name formed by one-byte letters and numbers that can be easily subjected to computer processing, for logging into the MFP. A "password" is one or more numbers, symbols, or alphabetical letters, or a combination thereof, by which the MFP authenticates the user Q.

In the usage amount limit information 20, the "upper limit usage amount", the "usage amount", and the "possible usage amount" are registered. According to the charging format, an "upper limit usage amount", a "usage amount", and a "possible usage amount" are registered both for color and monochrome.

The "upper limit usage amount" is the usage amount that the user Q can use. The "upper limit usage amount" is defined for each user for a particular time period, such as one year, half a year, quarter of a year, a month, and a week. The "usage amount" is the amount that the user Q has already used within the time period defined for the "upper limit usage amount".

The "possible usage amount" is the amount that the user Q can use within the time period. The relationship of "possible usage amount"="upper limit usage amount"−"usage amount" is satisfied.

The "possible usage amount" is updated every time a user Q uses a printing function, etc. When the "possible usage amount" becomes zero, the job management module 17 prohibits printing. In FIG. 9, the "upper limit usage amount", the "usage amount", and the "possible usage amount" are registered. However, as long as there is the "possible usage amount", or the "upper limit usage amount" and the "usage amount", the usage amount can be managed. When the user Q logs into the MFP and operates the operations panel 130, the usage amount limit information 20 is displayed on the display unit 170, and therefore the user Q can confirm the "possible usage amount".

Device Management Information

FIG. 9 illustrates an example of the device management information 21. In the device management information 21, functions of the MFP itself are registered. For example, for the function of "scan", readable colors (full-color, black-and-white, two-color, or monochrome), the resolutions (100 through 600 dpi) that can be set at the time of scanning, and the original document type corresponding to the scanning operation (characters, photograph, characters/photograph) are registered.

As the editing functions, combining plural pages (2 in ¼ in ⅛ in 1), stamp printing for printing characters and symbols on an original document in a stamp format, copy guard for preventing fraudulent printing, magnification (25% through 200%) for reducing/enlarging by image processing, OCR for character recognition, and a PDF for converting the file format of image data, are registered.

As the outputting functions, fax and printing are registered. Furthermore, in the fax function, a storage transmission function is registered. In the printing function, the printing speed (60 pages/minute), power consumption (black-and-white printing, color printing, time of standup), stapling, punching, and Z-folding, are registered. As for stapling and punching, the positions on the sheet for performing these functions are also registered.

The MFP 1 and MFP 2 exchange their device management information 21, so that the processes that the MFP 1 can request to the MFP 2 and the processes that the MFP 2 can request to the MFP 1 can be managed at the MFP 1 and MFP 2. The MFP 1 and MFP 2 acquire the device management information 21 of the MFPs that are registered in a list of communication possible devices described below, and save the acquired information in the HDD 105.

Process of Functional Blocks During Cooperation

FIG. 10 illustrates the relationship between blocks when the MFP 1 and MFP 2 perform device cooperation. In FIG. 10, the same elements as those of FIG. 7 are denoted by the same reference numerals, and are not further described. Option trays 24 and 26 are sheet trays that can be additionally attached, and a finisher 25 is a device for performing stapling, punching, sorting, and binding.

List of Communication Possible Devices

The communication management module 15 includes a list of communication possible devices 23 of other MFPs and servers that are confirmed as being activated. There are the two following methods for acquiring the list of communication possible devices.

1) An administrator registers in advance in the MFP 1, the MFPs 2 through 4 with which device cooperation is possible, and the MFP 1 registers the MFP with which communication is possible among the registered MFPs 2 through 4, in the list of communication possible devices.

FIG. 11A illustrates an example of IP addresses of MFPs with which device cooperation is possible. In order to be able to perform device cooperation, the MFP needs to have a function of device cooperation. Furthermore, the MFP is not to be intentionally excluded from the targets of device cooperation by the administrator, or the MFP is to be added as the target of device cooperation. Hereinafter, an MFP that can perform device cooperation is referred to as a "device cooperation-use MFP". In each MFP, the IP addresses of device cooperation-use MFPs as viewed from itself are registered.

For example, when the MFP 1 is activated, the MFP 1 reports that is has been activated to the device cooperation-use MFPs that are registered in itself and in the network. Accordingly, when the device cooperation-use MFP is activated, the device cooperation-use MFP sends a response, and therefore the MFP 1 registers in the list of communication possible devices that the device cooperation-use MFP from which a response is received is able to communicate. Meanwhile, the device cooperation-use MFPs that are already activated receive that the MFP 1 has been activated and register the MFP 1 in their respective lists of communication possible devices.

FIG. 11B illustrates an example of a list of communication possible devices. The communication management module 15 registers, in the list of communication possible devices, the IP addresses of MFPs that are confirmed as being able to communicate, among the device cooperation-use MFPs. For the IP address of an MFP that cannot be confirmed as being able to communicate, data such as a "−" mark indicating that it is not confirmed as being able to communicate is registered.

2) The MFP 1 detects, in the network, the MFP 2 through 4 that can perform device cooperation.

For example, when the MFP 1 is activated, the MFP 1 broadcasts a broadcast packet requesting to report an IP address to the MFPs that are able to perform device cooperation. A broadcast packet in which all transmission addresses are "1" can inquire whether device cooperation is possible, to all devices in the LAN 1.

Furthermore, for example, by specifying a directed broadcast address, it is possible to inquire whether device cooperation is possible, to MFPs having network addresses that are specified regardless of routers. The network addresses in a network to which the MFPs that can perform device cooperation belong, are known by the administrator, and therefore the search range can be easily identified.

More preferably, 1) and 2) are combined to detect the MFPs that can perform device cooperation. The MFP 1 registers the IP addresses of the detected MFPs 2 through 4, in the list of communication possible devices.

User Authentication

By the following operations described below, the user identifies the MFPs 100 for executing a device cooperation job from a list of communication possible devices, and the MFPs 2 to 4 to which user information is sent from the MFP 1 are identified. Here, a description is given of procedures performed by the MFP 2 to authenticate the user Q, assuming that the MFP 1 and the MFP 2 execute the device cooperation job.

FIG. 12 is an example of a flowchart indicating procedures performed by the MFP 1 and the MFP 2 for authenticating a user Q.

When the user Q operates the MFP 1 to execute a device cooperation job, the user Q logs into the MFP 1. Accordingly, the copy application 11 sends an authentication request to the authentication module 18. The authentication request includes a user name and a password input by the user Q.

The authentication module 18 determines whether the user Q can be successfully authenticated based on whether the combination of the user name and the password is registered in the usage amount limit information (step S1).

When the authentication is unsuccessful (NO in step S2), the user Q does not have the authority to use the MFP 1, and therefore the process of FIG. 12 ends.

When the authentication is successful (YES in step S2), the user information sending unit 33 of the MFP 1 sends the user information of the user Q to the MFP 2 (step S3). The user information to be sent includes the user name and password necessary for user authentication as mandatory information, the log-in date, the log-in device, user type, and the authentication method. The log-in date is the date that the user Q has logged into the MFP 1 (when the authentication is successful), the log-in device is the identification information (e.g., the IP address) of the MFP 1 which the user Q has logged into, the user type is information indicating the authority of the user Q such as an administrator, and the authentication method indicates either local authentication or network authentication. Furthermore, the user ID and the log-in name may also be sent.

The timing at which the user information is sent after the user is successfully authenticated may not be immediately after the successful authentication; the timing may be after the devices for executing the device cooperation job are determined.

The MFP 2 receives the user information of the user Q (step S5). The job management module 17 of the MFP 2 sends an authentication request to the authentication module 18.

The authentication module 18 of the MFP 2 determines whether the user Q can be successfully authenticated based on whether the combination of the user name and the password is registered in the usage amount limit information (step S6).

The user Q sends the authentication result to the MFP 1 (step S7). The MFP 1 receives the authentication result (step S4).

The authentication result may indicate authentication OK or authentication NG. When the MFP 1 receives authentication OK, the MFP 1 can allocate a page number to the MFP 2 and start executing the device cooperation job. The case where the MFP 1 receives authentication NG is described below.

When the MFP 1 executes the device cooperation job with two or more MFPs, the user information sending unit 33 of the MFP 1 sends the user information to all of the MFPs.

Job Setting

When the authentication is successful, the copy application 11 receives a setting of execution conditions of a job.

Figure 13:
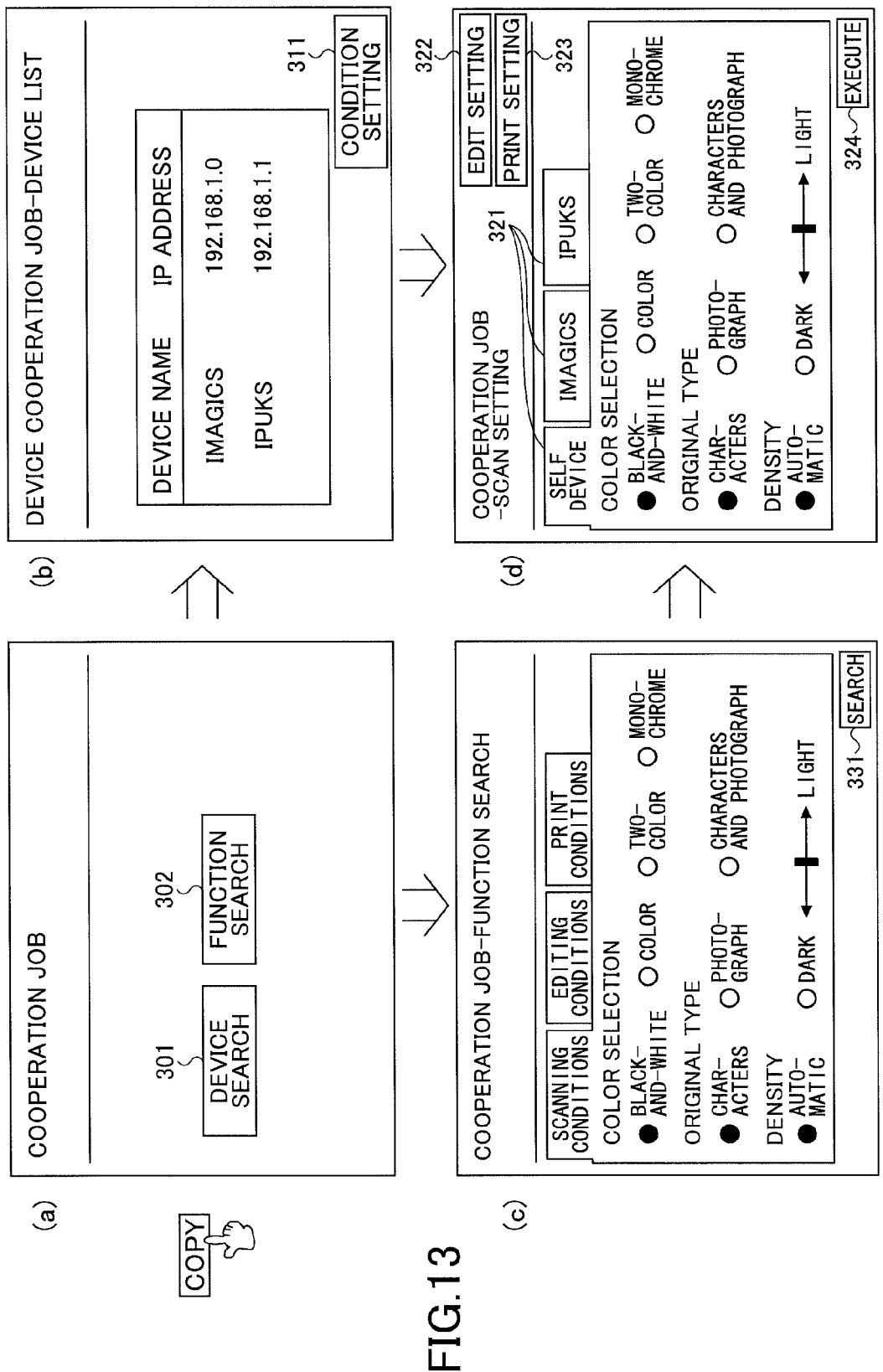
FIG. 13 illustrates an example of a menu of a device cooperation job displayed on a display unit.

FIG. 13 illustrates an example of a menu of a device cooperation job displayed on the display unit 170. For example, when the user Q instructs copying by a device cooperation job, the user Q presses the copy button of the operations panel 130, or calls a setting screen of the device cooperation job.

In the operations panel 130, for example, a device search button 301 and a function search button 302 are displayed. The device search button 301 is a button for having the MFP 1 search for MFPs in the list of communication possible devices. That is to say, the communication management module 15 confirms that the device cooperation job is possible by communicating with MFPs in the list of communication possible devices, immediately before the device cooperation job. Meanwhile, the function search button 302 is for having the MFP 1 search for the MFPs 2 through 4 that can provide a function set by the user Q, from among the MFPs in the list of communication possible devices.

FIG. 13 (*b*) illustrates an example of a "device cooperation job-device list" screen displayed when the user Q presses the device search button 301. The MFP 1 displays a list of the MFPs 2 through 4 (two in FIG. 13) that have responded as being able to execute a device cooperation job, among the MFPs in the list of communication possible devices. A responding MFP sends its device name and IP address to the MFP 1. At this time, the responding MFP sends the device management information 21. The user Q confirms that a target MFP having the desired function is in the list, and presses a condition setting button 311.

FIG. 13 (*d*) is an example of a "cooperation job-scan setting" screen displayed when the user Q presses the condition setting button 311. In this screen, a scan setting menu is displayed for each MFP. As illustrated in FIG. 13 (*d*), device names are displayed in the tabs 321 as "OWN DEVICE (referring to MFP 1)", "IMAGICS (MFP 2)", and "IPUKS (MFP 3)". The user Q can select a MFP for making a scan setting by selecting a tab 321.

When the user Q selects a tab 321 of a device name, the MFP 1 displays only the valid menus (that can be selected) for the selected MFP, based on the device management information 21.

The user Q can set scanning conditions such as color selection, original document type, and density, from the valid menus of the selected MFP. When the user Q sets the MFP for scanning the original document and the scanning conditions, the user Q sequentially selects an edit setting button 322 and a print setting button 323. When the user Q selects the edit setting button 322, a menu for selecting editing functions that the device can provide is displayed for each MFP. Similarly, when the user selects the print setting button 323, a menu for selecting printing functions that the device can provide is displayed for each MFP. As for the scan setting, the user Q can set conditions for only one MFP, but as for the print setting and edit setting, the user Q can set conditions for plural MFPs or servers. Finally, by pressing an execute button 324, the device cooperation job is started.

Furthermore, FIG. 13 (*c*) is an example of a "cooperation job-function search" screen displayed when the user Q presses the function search button 302. The MFP 1 displays a menu that can be set for each of the processes of "scanning conditions", "editing conditions", and "print conditions", from the device management information 21 of other MFPs acquired in the past. The user Q selects an appropriate tab to set the "scanning conditions", "editing conditions", and "print conditions" which are search keys.

After setting the conditions, when the user Q presses a search button 331, the MFP 1 searches the device management information 21 acquired from another MFP in terms of the "scanning conditions", "editing conditions", and "print conditions". By doing so, it is possible to identify an MFP that can perform scanning according to the "scanning conditions" set by the user Q, an MFP or a server than can perform editing according to the "editing conditions", and an MFP that can perform printing according to the "print conditions".

There are cases where the search hits plural devices matching the "scanning conditions", plural devices matching the "editing conditions", and plural devices matching the "print conditions". In this case, as shown in FIG. 13 (*d*), the MFP 1 may display all devices for each of the "scanning conditions", "editing conditions", and "print conditions", or may narrow down the number of devices to less than or equal to a predetermined number. To narrow down the number of devices to less than or equal to a predetermined number, a method of prioritizing the device itself (e.g., the MFP 1), a method of prioritizing an MFP in which the resource load is decreasing, and a method of prioritizing an MFP that is positioned at a distance near the device itself (physical distance or communication distance) may be performed.

The MFP 1 displays the one or more MFPs that are hit by the search on a screen similar to FIG. 13 (*d*). That is to say, the MFP 1 displays the MFPs that match the conditions, by the "scan setting", the "edit setting", and the "print setting". The "scanning conditions", "editing conditions", and "print conditions" are set in FIG. 13 (*c*), and therefore the user Q does not need to set the conditions again. The user Q presses an "execution" button after confirming the MFPs of the processes and conditions. Accordingly, the MFP 1 starts the device cooperation job.

FIG. 14A illustrates an example of a first screen of the print setting, when the user Q presses the print setting button 323 in FIG. 13 (*d*). In FIG. 14A, the user may select whether to set print conditions common to plural MFPs, or to set separate print conditions for the respective MFPs. In the case where common settings are selected, the user Q selects more than one MFP. In the case where separate settings are selected, the user Q sets print conditions for the respective MFPs in the next screen.

Furthermore, when the user Q sets a copy application or a printer application, the MFP 1 can acquire, from the MFPs in the list of communication possible devices, the elapsed time from the first printing operation and the power consumption for restoring the temperature at which printing is possible (print possible temperature), and display these elements. During printing, a large amount of power is necessary for increasing the temperature of a fixing unit to the print possible temperature (minimal printing temperature). Therefore, the power consumption may be reduced if the user Q selects an MFP with a short elapsed time since the last printing operation or an MFP having low power consumption for restoring the print possible temperature.

FIG. 14B illustrates an example of a screen for common settings in print conditions. When the user Q selects common settings, the user Q may set print conditions common to the MFPs, such as color/black-and-white, sheet size, number of copies, and magnification. The common print conditions are contents corresponding to the largest common denominator of device management information received from the MFPs in the list of communication possible devices. For example, when the MFP 1 can perform both color printing and black-and-white printing, and the MFP 2 can only perform black-and-white printing, color is not displayed in the "color/black-and-white" menu of FIG. 14B. Similarly, in the "sheet size" menu, only the sheet sizes that can be selected both in the MFP 1 and the MFP 2 are displayed. In the magnification menu, only the magnification range that can be selected both in the MFP 1 and the MFP 2 can be set. Sorting and stapling is displayed only when they can be selected both in the MFP 1 and the MFP 2.

Furthermore, the set number of copies (or number of pages) is allocated to the MFPs that are the target of common settings. The user Q may set whether to allocate a number of copies or a number of pages.

FIG. 14C illustrates an example of a screen for separate settings in print conditions. When the user Q selects separate settings, general print conditions such as sheet size, number of copies, and magnification may be set for each MFP. The respective MFPs print out the number of set copies.

Counting Usage Amount

The counter management module 19 counts the usage amount by a method set in advance. The following counting methods are merely examples; different counting methods may be used by the devices.

(1) Copy application, printer application
  (i) Separately count color printing and black-and-white printing
  (ii) Count printing on one side as one page
  (iii) Count printing on a sheet that is greater than or equal to a predetermined sheet size (for example, A3) as two pages (2) Fax application (use any of the following methods set by administrator)
  (i) Count number of pages at the time of transmission (color printing is rarely used in fax transmission, and sheet sizes greater than or equal to A3 are rare in fax transmission)
  (ii) Count one transmission destination as one, regardless of the number of pages being transmitted
  (iii) Count the gross number of transmitted pages (number of pages at the time of transmission×number of destinations)

In the case of a copy application or a printer application, the engine management module 16 or the resource management module 14 counts the printing number by each page. Every time one page is printed or when the job is completed, the job management module 17 acquires the number of printed pages, counts the printing number according to the above counting methods, and updates the usage amount and the possible usage amount of the usage amount limit information 20. Similarly, in the fax application 13, the engine management module 16 or the job management module 17 counts the number of scanned original documents or the number of pages of the image data. The job management module 17 acquires the number of pages when a job is completed, and updates the usage amount and the possible usage amount of the usage amount limit information 20.

Job Information

When a setting of job execution conditions is received, the copy application 11 in FIG. 10 sends a job execution request to the job management module 17. The job management module 17 generates job information from the execution conditions.

FIGS. 15A through 15E illustrate an example of job information. The device cooperation job is executed in the order of "1. input→2. edit→3. output". For each process, a "device in charge" is registered, and input conditions, edit conditions, and output conditions are registered.

Copy Application

FIG. 15A illustrates an example of a job of the copy application 11 in which only the MFP 1 performs printing, indicated as a matter of comparison. In the copy application, the device in charge of input is the MFP 1, the device in charge of editing is the MFP 2, and the device in charge of output (printing) is the MFP 1.

FIG. 15B illustrates an example of a device cooperation job of the copy application 11 printed by the MFP 1 and the MFP 2. In the copy application, the device in charge of input is the MFP 1, the device in charge of editing is the MFP 2, and the devices in charge of output (printing) are the MFP 1 and MFP 2. As described above, in order to divide the printing operation between the MFP 1 and MFP 2, "common settings" is selected in the "print settings".

The allocated number determining unit 31 allocates a number of copies to the respective devices in charge (print number). The method of determining the number of allocated pages is described below. FIG. 15C illustrates an example of the device cooperation job whose print number is allocated to the MFP 1 and MFP 2. Compared to FIG. 15B, two output processes are created, and the MFP 1 and the MFP 2 are set as the respective devices in charge. The job management module 17 sends, to the MFP 2, a print request of which the device in charge of output is the MFP 2 together with job information (the whole job information may be sent). In the "print setting", when the user selects "separate settings", the job information of FIG. 15C is directly generated. User authentication is not described here.

The summary of procedures of the copy application 11 in the case of FIG. 15C is described below.

1. First, the job management module 17 sends a usage request of the scanner engine of the device itself to the resource management module 14. The resource management module 14 confirms that the usage flag of the scanner engine is not indicating "in use", and secures the scanner engine. Next, the resource management module 14 acquires scanning conditions (double-sided scanning, original document type (characters), 300 dpi, black-and-white) from the job management module 17, sets the scanning conditions in the scanner engine, and scans an original document. The resource management module 14 detects that there are no more original documents in the ADF (automatic document feeder) with a sensor, and reports that scanning is completed to the job management module 17. The generated image data of the original document is stored in the HDD 105. The allocated page number can be determined when the number of pages of the image data is known.

2. Because the device in charge of editing is the MFP 2, the job management module 17 sends the image data and the editing conditions to the MFP 2 via the communication management module 15. The MFP 2 performs a 4-in-1 process (combining four pages onto one sheet) on the image data and transmits the processed image data to the MFP 1. The communication management module 15 reports to the job management module 17 that the image data has been received from the MFP 2.

The job management module 17 sends, to the MFP 2, the job information and image data whose device in charge is the MFP 2.

3. The job management module 17 of the MFPs 1, 2 confirms whether the allocated page number is less than or equal to the possible usage amount in the usage amount limit information 20, at least before printing all pages. Specifically, the counter management module 19 counts the number of pages to be printed, and compares this with the possible usage amount. When the counted allocated page number is greater than the possible usage amount, the following control operations are implemented. It is defined in the setting of the MFP 1 as to which one of the following control operations is to be implemented.

Print a number of pages according to the possible usage amount set as the upper limit Abort the device cooperation job without printing any pages 4. The job management module 17 of the MFP 1 and the MFP 2 sends a usage request of the plotter engine of the device itself to the resource management module 14. The resource management module 14 confirms that the usage flag of the plotter engine is not indicating "in use", and secures the plotter engine. Next, the resource management module 14 acquires print conditions (black-and-white, three copies (MFP 1) or two copies (MFP 2), A4, punch) from the job management module 17, sets the print conditions in the plotter engine, and executes printing. The resource management module 14 reports, to the job management module 17, that printing of all pages has been completed.

Fax Application

Figure 15D:
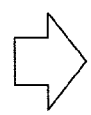

FIG. 15D illustrates an example of job information of a device cooperation job of a fax application. In FIG. 15D, the device in charge of input is the MFP 1, the device in charge of editing is the MFP 1, and the devices in charge of output (fax transmission) are the MFP 1 and MFP 2. In order to divide the fax transmission operation into the MFP 1 and MFP 2, the user Q sets, in the transmission setting of the scanner application, a plural number of destinations (fax numbers) corresponding to the number of copies of the copy application.

When there are plural destinations (in the case of broadcasting), the allocated number determining unit 31 determines the destinations for each device in charge, in units of destinations. For example, when there are two destinations, and there are two MFPs in charge of fax transmission, each MFP becomes in charge of one destination. When there are an N number of destinations, and there are an M number of MFPs in charge of fax transmission, each MFP become in charge of N/M number of destinations.

Furthermore, it is efficient to allocate a destination to an MFP that is near the destination. For example when the MFP 1 is in Tokyo and the MFP 2 is in Osaka, and the respective area codes are 03 and 06, a destination having an area code of 03 is allocated to the MFP 1, and a destination having an area code of 06 is allocated to the MFP 2. By doing so, communication costs can be reduced. In this case, a table in which the area codes of destinations to be handled by each MFP is prepared.

Figure 15E:

FIG. 15E illustrates an example of a device cooperation job whose destinations are allocated to the MFP 1 and the MFP 2. Compared to FIG. 15D, two output processes are created, and MFP 1 and MFP 2 are respectively set as the device in charge of each output process. The job management module 17 sends, to the MFP 2, the job information whose device in charge of output is the MFP 2 (the whole job information may be sent).

In the case of FIG. 15E, the procedures of the fax application are briefly described below. User authentication is not described here.

1. The input process is the same as the case of the copy application. The image data of an original document generated by scanning is stored in the HDD 105.

2. The job management module 17 enlarges the image data by 120% because the device in charge of editing is the MFP 1.

The job management module 17 sends, to the MFP 2, the job information and image data whose device in charge is the MFP 2.

3. The job management modules 17 of the MFP 1 and the MFP 2 confirm that the number of pages is less than or equal to the possible usage amount of the usage amount limit information 20 before starting fax transmission. When the number of pages is greater than the possible usage amount, the following control operations are implemented. It is defined in the setting of the MFP 1 as to which one of the following control operations is to be implemented.

Perform fax transmission according to the possible usage amount set as the upper limit Abort the device cooperation job without performing fax transmission 4. The job management modules 17 of the MFP 1 and the MFP 2 send a usage request for using the FCU 140 in the device itself to the resource management module 14. The resource management module 14 confirms that the usage flag of the FCU 140 is not indicating "in use", and secures the FCU 140. Next, the resource management module 14 acquires the fax transmission conditions (fax number of destination) from the job management module 17, sets the fax transmission conditions in the FCU 140, and executes printing. The resource management module 14 reports that fax transmission of all pages has been completed to the job management module 17.

Log

When the MFP performs some functions, the log recording unit 35 records a log. "Some functions" are defined in advance, and the user Q and the administrator can select the functions for which a log is to be recorded from among the predefined functions.

Figure 16A:
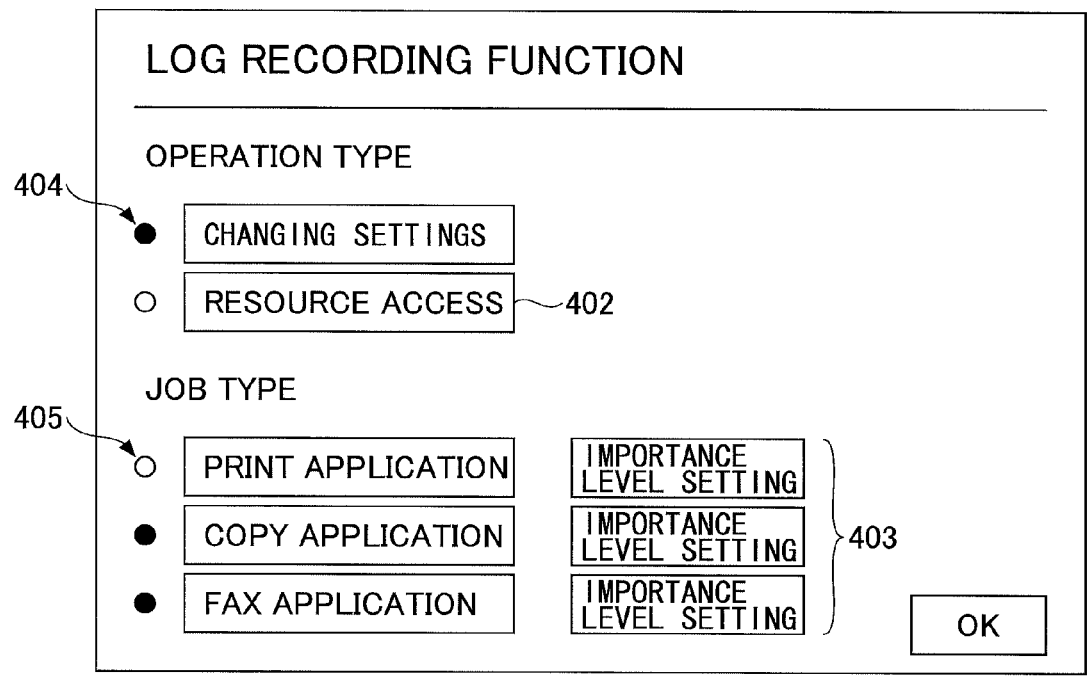
FIGS. 16A and 16B illustrate an example of a log recording function screen and an importance level setting screen displayed on the display unit.

FIG. 16A illustrates an example of a log recording function screen displayed on the display unit. Functions for which a log is recorded include operation type functions and job type functions. Logs for operation type functions are logs of operations of the MFP which do not involve execution of a job, and logs for job type functions are logs of operations of the MFP which involve execution of a job.

Examples of logs for operation type functions are changing settings 401 and resource access 402. When recording these logs, the user Q and or administrator selects a radio button 404 of changing settings 401 and resource access 402. When changing settings 401 is selected, set values before and after being changed are recorded as the log when the user Q changes an image processing parameter (γ correction value, look-up table, etc.) or an image forming parameter (fixing temperature, line speed, etc.). When resource access 402 is selected, a log is recorded when the user Q displays the image data stored in the MFP by preview display or deletes the image data.

Examples of logs for job type functions are a printer application, a copy application, and a fax application. When recording these logs, the user Q and or administrator selects a radio button 405 of a printer application, a copy application, and a fax application.

When a printer application is selected, a log is recorded when the user Q prints out a document from a PC, when a copy application is selected, a log is recorded when the user takes a copy, and when a fax application is selected, a log is recorded when the user transmits or receives a fax.

Furthermore, in the present embodiment, when job type functions are selected for recording a log, the user Q can set the importance level by selecting an importance level setting 403 for each application.

Figure 16B:
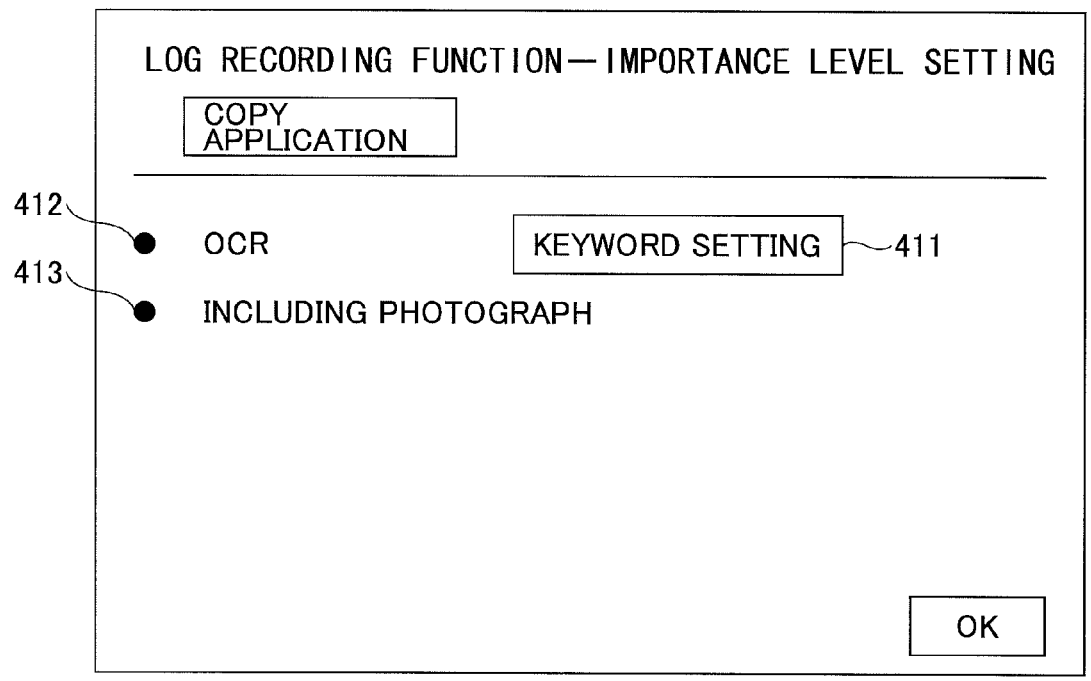

FIG. 16B illustrates an example of an importance level setting screen. In FIG. 16B, a copy application is taken as an example. The importance level setting screen includes a radio button 412 for OCR and a radio button 413 for including photograph.

When the radio button 412 for OCR is selected, the MFP records a log by functioning as follows.
(i) When a job of a copy application is executed, the MFP performs an OCR process on each page of the original document.
(ii) It is determined whether a keyword is included in the text data obtained by the OCR process.
(iii) When there is at least one keyword included in the text data, the MFP records a log of the copy application.

Keywords of an initial setting are set as the keywords. Furthermore, by pressing a keyword setting button 411, the administrator can edit the keyword. Examples of keywords are an account number (a number of six to eight digits), confidential, a telephone number (a number of 11 digits starting with 090, 080, and 070, a number of 10 to 12 digits starting with zero), contract, request for managerial decision, strategy, and patent. Furthermore, it may be set to record a log when two or more keywords are included or when three or more keywords are included.

In the case of a scanner application, it can be determined whether a keyword is included by OCR. In the case of a printer application, an OCR is unnecessary, and therefore a field for selecting OCR is not needed in the importance level setting screen.

When the radio button 413 for including photograph is selected, the MFP records a log by functioning as follows.
(i) When a job of a copy application is executed, the MFP separates the pages of the original document into image areas. This process is typically performed for performing appropriate image processing in each area of the image data.
(ii) Determine whether a photograph is included in the image data.
(iii) When there is at least one photograph included in the image data, the MFP records a log of a copy application.

For example, separating image areas is performed by extracting characteristics such as extracting halftone dot parts formed by typical printing, extracting edge parts such as characters, determining whether the image data is chromatic or achromatic, and determining a white background indicating whether the background of the image is white. In the case of a scanner application also, it can be determined whether a photograph is included by image area separation. In the case of a print application, the PDL data is divided into a character area, an image area, and a line area, and therefore it can be determined whether a photograph is included without image area separation.

The administrator can set standards for determining important documents for each MFP, as illustrated in FIGS. 16A and 16B. Therefore, the determination as to whether to record a log may differ according to the MFP.

FIG. 17 illustrates an example of log data that the MFP 1 has recorded in a device cooperation job. FIG. 17 indicates log data of a copy application.

"Log ID" is an identifier for the MFP to independently identify log data.

"Job execution result" indicates whether copying, etc., has been executed without any errors.

"Start time" is the time when the device cooperation job has started.

"End time" is the time when the device cooperation job has ended.

"User name" is a user name and a user ID of the user who has used (for example, logged in) the MFP.

"Operation source information" indicates the device (operation panel, MFP, PC) that requested to execute the job.

"Device cooperation" indicates items recorded in the case of a device cooperation job, such as a cooperation log ID, master, and device cooperation.

"Device log ID" is an identifier for the MFP to independently identify the log of a device cooperation job. The device log ID is common to other MFPs executing the device cooperation job.

"Master" is identification information of a device that first received a setting of the device cooperation job, and an IP address is used in FIG. 17.

"Cooperation device" is identification information of the MFP that performs scanning, editing, and outputting. As indicated in FIG. 15 (*c*), the MFP 1 performs scanning, the MFP 2 performs editing, and the MFPS 1 and 2 perform outputting.

"Application type" is the application that controls the job executed by the user.

"Execution condition" includes information for identifying execution conditions according to the type of job. For example, in the case of a copy application, the execution conditions include scanning conditions and printing conditions. The scanning conditions include information such as single-sided/double-sided, color, number of pages of document, number of pages, type of original document, resolution, and density. The printing conditions include information such as number of copies, sheet size, color setting, double-sided/single-sided, staple, and punch position.

FIGS. 18A and 18B illustrate an example of log data that the MFP 2 recorded in a device cooperation job. The MFP 2 executes editing and outputting, and therefore two sets of log data are created. FIG. 18A is log data for editing. The log ID is to be unique to the MFP 2, and is thus different from FIG. 17. "Job execution result", "start time", "end time", and "user name" are the same as the MFP 1. "Operation source information" is the identification information of the MFP 1, because the MFP 2 receives a processing request from the MFP 1.

"Cooperation log ID" in "device cooperation" is the same as that of the MFP 1. The cooperation log ID is sent together with the image data from the MFP 1 to the MFP 2. Therefore, according to the cooperation log ID, the log data of the device cooperation job stored in the respective MFPs can be associated to each other. "Master" is the identification information of the MFP 1. The MFP 2 executes the process by device cooperation, and therefore the "application type" is "cooperation". Similar to the MFP 1, "copy application" may be registered.

FIG. 18B is log data of printing (outputting). The items from "log ID" through "application type" are the same as those of FIG. 18A. Furthermore, the "execution conditions" are the same as those of the MFP 1 except for the number of copies. The MFP 2 records log data as illustrated in FIGS. 18A and 18B, so that the job executed by the MFP 1 and the fact that the MFP 2 and MFP 1 performed device cooperation are recorded.

In the case of a fax application, the execution conditions include the transmission line, the destination name, the destination number, and the number of transmitted pages; however, as to device cooperation, the same information as the copy application is registered.

Overall Operation Procedures of Device Cooperation Job

Figure 19A:
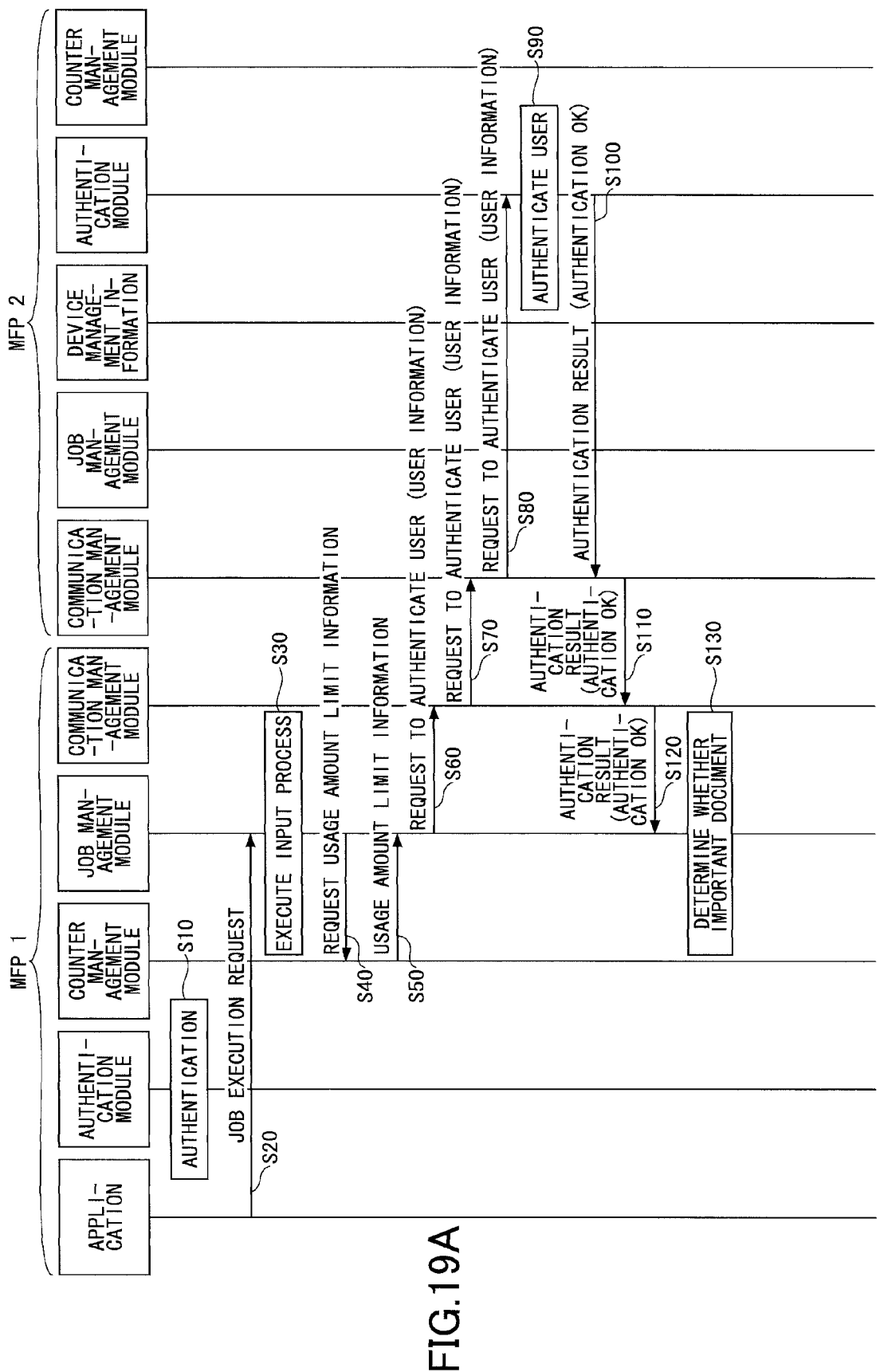
FIGS. 19A through 19C show a sequence diagram illustrating procedures of executing a device cooperation job performed by the MFP 1 and the MFP 2.
Figure 19B:
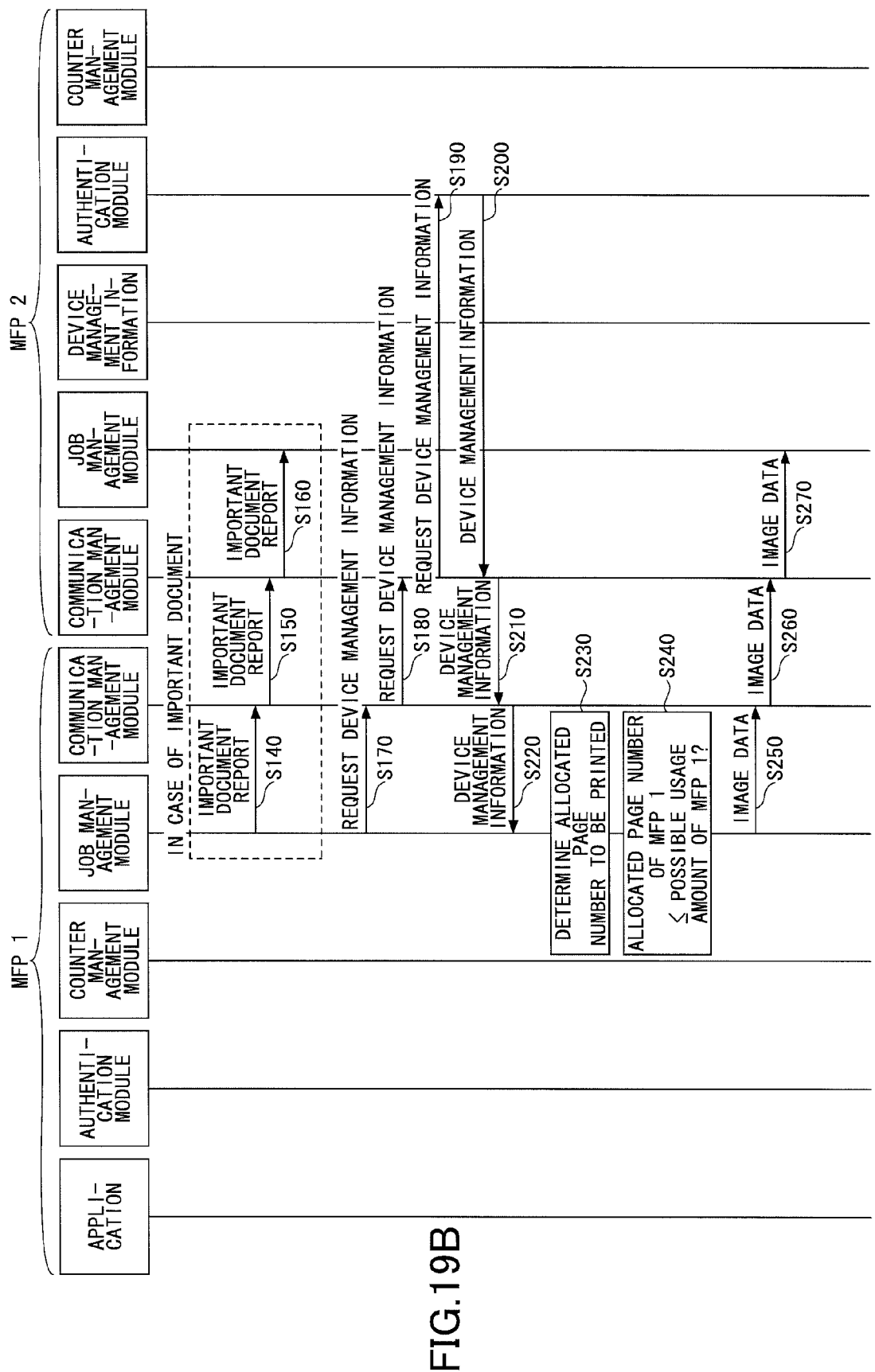
Figure 19C:
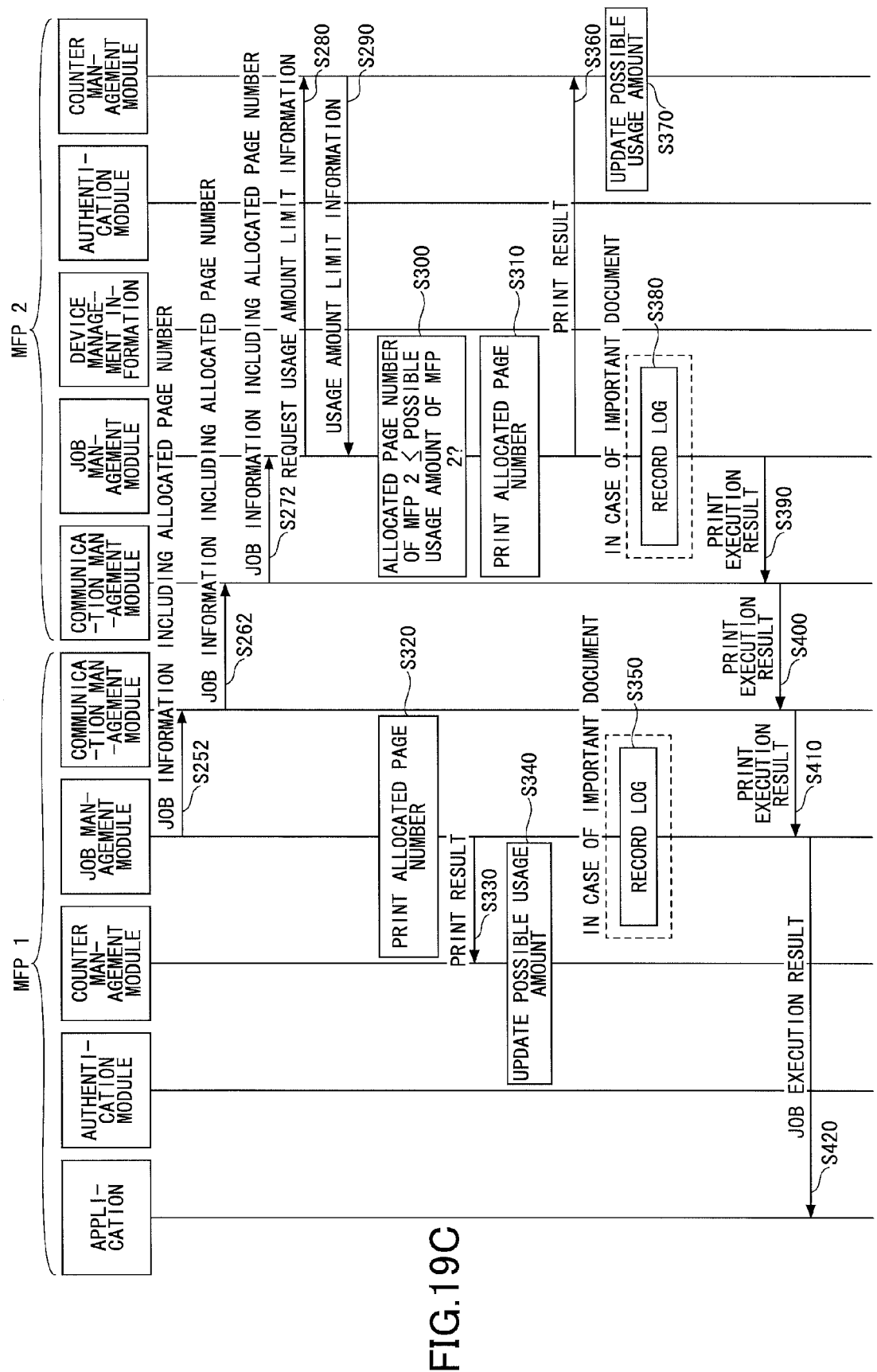

FIGS. 19A through 19C show a sequence diagram illustrating procedures of executing a device cooperation job performed by the MFP 1 and the MFP 2. Here, the copy application 11 is taken as an example.

The authentication module 18 authenticates the user Q, and reports the authentication result to the copy application (step S10).

When the authentication is successful, the user Q sets job execution conditions. The copy application sends a job execution request for the device cooperation job to the job management module 17 (step S20).

The job management module 17 executes an input process in cooperation with the resource management module 14 and the engine management module 16 (step S30). By scanning an original document and generating image data, the number of pages of the image data is defined. Specifically, when the conditions include 50 sheets of original documents, double-sided scanning, combining 4-in-1, single-sided printing, and printing five copies, the number of pages per copy is calculated as follows.

50×2(double-sided)/4=25 pages

Therefore, in the case of five copies, the number of pages is calculated as follows.

25 pages×5 copies=125 pages

Next, the job management module 17 requests the counter management module 19 to acquire the usage amount limit information 20 (step S40).

The counter management module 19 reads the possible usage amount from the usage amount limit information 20, and sends the possible usage amount to the job management module 17 (step S50).

Next, the user information sending unit 33 requests the communication management module 15 to authenticate the user Q of the MFP 2 (step S60). This request includes user information. The communication management module 15 of the MFP 1 sends an authentication request for the user Q to the communication management module 15 of the MFP 2 (step S70). The communication management module 15 of the MFP 2 sends an authentication request for the user Q to the authentication module 18 (step S80).

The authentication module 18 of the MFP 2 authenticates the user Q (step S90). The authentication module 18 sends the authentication result to the job management module 17 of the MFP 1 (steps S100 through S120). Here, it is assumed that the authentication is successful. When the authentication is successful, the MFP 1 determines that the device cooperation job can be executed by cooperating with the MFP 2.

Next, the important document determination unit 36 of the job management module 17 determines whether the original document is an important document. As described above, the administrator registers the method of determining whether the document is an important document and a keyword in the importance level setting screen, and therefore the important document determination unit 36 determines whether the document is an important document based on the settings (step S130).

When the document is determined to be an important document, the job management module 17 sends an important document report to the MFP 2. The MFP 2 detects that a log is to be recorded according to the important document report. The job management module 17 requests the communication management module 15 to request the MFP 2 to send the important document report (step S140). The communication management module 15 of the MFP 1 sends the important document report to the communication management module 15 of the MFP 2 (step S150). The communication management module 15 of the MFP 2 sends the important document report to the job management module 17 (step S160).

Next, the job management module 17 requests the communication management module 15 to acquire the device management information 21 from the MFP 2 (step S170). The communication management module 15 communicates with the communication management module 15 of the MFP 2 (step S180). The communication management module 15 of the MFP 2 requests the resource management module 14 to provide the device management information 21 (step S190). The resource management module 14 is not shown in FIG. 16. The resource management module 14 reads the device management information 21 and sends the device management information 21 to the communication management module 15 (step S200). The communication management module 15 of the MFP 2 sends the device management information 21 to the communication management module 15 of the MFP 1 (step S210). The communication management module 15 of the MFP 1 sends the device management information 21 of the MFP 2 to the job management module 17 (step S220).

Here, the job management module 17 determines the allocated page number for the MFP 1 and the MFP 2 if necessary. "If necessary" means when the user has selected common settings in FIG. 14A. When the user has selected separate settings, the number of copies of the MFP 1 and the MFP 2 are set by the user, and therefore the job management module 17 does not need to determine the allocated page numbers for the MFP 1 and the MFP 2.

When determining the allocated page number, the allocated number determining unit 31 of the job management module 17 determines the allocated page number for the MFP 2 based on the device management information 21 of the MFP 1 and the MFP 2 (step S230). For example, there are the following three methods of determining the allocated page number.

a) Determining Number of Pages to be Allocated Based on Printing Speed

The allocated number determining unit 31 determines the number of pages to be allocated to the MFP 2 so that the printing is completed most quickly. The printing is completed most quickly when the MFP 1 and the MFP 2 complete printing at substantially the same time, and therefore the number of pages to be allocated to the MFP 2 may be determined by the following formula. It is assumed that the printing speed of the MFP 1 is n1 sheets/minute, the printing speed of the MFP 2 is n2 sheets/minute, and the total number of pages is N. The result is rounded up.

$$\text{Number of pages to be allocated to MFP } 2 = N \times \{n2/(n1+n2)\}$$

When one copy is printed, N=number of pages (25 pages as described above). When plural copies are printed, N=number of copies (five copies as described above), which is divided by the number of MFPs cooperating with each other, and the remainder is allocated to the MFP having a higher printing speed, so that the pages can be allocated in units of copies. That is to say, 5÷2=2.5, and therefore two copies are allocated to the MFP 1 and three copies are allocated to the MFP 2 (when the MFP 2 has a higher printing speed).

When plural copies are printed and N=number of pages, and the number of pages allocated to the MFP 2 is not an integral multiple of 25 pages, the 25 pages corresponding to one copy is allocated to the MFP 1 and the MFP 2. That is to say, the quotient and remainder obtained from the number of pages allocated to the MFP 2÷25 pages, and the quotient and remainder obtained from the number of pages allocated to the MFP 1÷25 pages, are calculated. The MFP 2 prints a number of copies corresponding to the quotient and a number of pages corresponding to the remainder (for example, pages of low numbers), and the MFP 1 prints a number of copies corresponding to the quotient and a number of pages corresponding to the remainder (for example, pages of high numbers).

By determining the number of pages to be allocated according to the printing speed, the time taken to complete a job can be minimized.

When there are three devices used for printing, the following calculation is performed.

$$\text{Number of pages allocated to MFP } 1 = N \times \{n1/(n1+n2+n3)\}$$

$$\text{Number of pages allocated to MFP } 2 = N \times \{n2/(n1+n2+n3)\}$$

$$\text{Number of pages allocated to MFP } 3 = N \times \{n3/(n1+n2+n3)\}$$

b) Determining Number of Pages to be Allocated Based on Printing Power Consumption When the power consumption is different when printing with the MFP 1 and the MFP 2, the job can be executed by minimum power consumption by printing all of the pages with the MFP of lower power consumption. In this case, the printing cannot be divided among plural MFPs, and therefore the printing time is longer. However, when the printing is switched between color printing and black-and-white printing in units of copies, power consumption can be minimized by printing the copies specified as color with the MFP having low power consumption for color printing, and printing the copies specified as black-and-white with the MFP having low power consumption for black-and-white printing. For example, when the power consumption for color printing of the MFP 1 is 40 W·h, the power consumption for black-and-white printing of the MFP 1 is 10 W·h, the power consumption for color printing of the MFP 2 is 30 W·h, and the power consumption for black-and-white printing of the MFP 2 is 13 W·h, the allocated number determining unit 31 allocates the copies specified as color printing to the MFP 2, and allocates the copies specified as black-and-white printing to the MFP 1.

Furthermore, when monochrome printing of either color or black-and-white is performed, the printing speed can be weighted by the power consumption to determine the number of pages to be allocated to the MFP 2. For example, assuming the power consumption of color or black-and-white of the MFP 1 is w1 W·h, and the power consumption of color or black-and-white of the MFP 2 is w2 W·h, the weighted printing speed is calculated as follows. That is to say, by weighting the printing speed by a lower weight as the power consumption is higher, it is possible to decrease the number of pages allocated to the MFP having high power consumption.

$$\text{Printing speed of MFP } 1 = n1\{w1/(w1+w2)\}$$

$$\text{Printing speed of MFP } 2 = n2\{w2/(w1+w2)\}$$

c) Determining Number of Pages to be Allocated Based on Equal Allocation

When the number of pages is allocated equally, the MFP 1 does not need to acquire the device information of the MFP 2, and the total number of pages is to be divided by the number of MFPs.

When the allocated page number is determined, the usage amount determining unit 32 of the job management module 17 determines whether the allocated page number allocated to the MFP 1 is less than or equal to the possible usage amount of the MFP 1 (step S240).

When the allocated page number of the MFP 1 is not less than or equal to the possible usage amount of the MFP 1, for example, the job management module 17 displays an error message on the display unit, and asks the user whether to perform printing partway or to cancel the job.

The job management module 17 of the MFP 1 collaborates with the resource management module 14 and the engine management module 16 to print the allocated page number (step S320). The job management module 17 reports the print results in units of output to the counter management module 19 (step S330). The counter management module 19 updates (subtracts) the possible usage amount of the MFP 1 in units of output (step S340).

Before the printing, or at the same time as the printing, the job management module 17 requests the communication management module 15 to send image data (S250). The communication management module 15 of the MFP 1 sends the image data to the communication management module 15 of the MFP 2 (step S260). The communication management module 15 of the MFP 2 sends the image data to the job management module 17 (step S270).

The job management module 17 of the MFP 1 requests the communication management module 15 to send job information of the output process among all the job information, including the allocated page number of the MFP 2 (step S252). The communication management module 15 sends the job information to the communication management module 15 of the MFP 2 (step S262). The communication management module 15 of the MFP 2 sends the job information to the job management module 17 (step S272). These steps may be omitted by being performed together with the handling of the image data.

The job management module 17 of the MFP 2 requests the counter management module 19 to acquire the usage amount limit information 20 (step S280). The counter management module 19 reads the possible usage amount from the usage amount limit information 20, and sends the possible usage amount to the job management module 17 (step S290).

The usage amount determining unit 32 of the job management module 17 of the MFP 2 determines whether the allocated page number allocated to the MFP 2 is less than or equal to the possible usage amount of the MFP 2 (step S300).

When the allocated page number of the MFP 2 is less than or equal to the possible usage amount of the MFP 2, the job management module 17 collaborates with the resource management module 14 and the engine management module 16 to print the allocated page number (step S310).

When the allocated page number of the MFP 2 is not less than or equal to the possible usage amount of the MFP 2, for example, the job management module 17 reports this to the MFP 1, and displays an error message on the display unit, and asks the user whether to perform printing partway or to cancel the job.

The job management module 17 of the MFP 2 reports the print results in units of output to the counter management module 19 (step S360). The counter management module 19 updates the possible usage amount of the MFP 2 in units of output (step S370).

When it is determined that the document is an important document at step S130, the log recording unit 35 of the MFP 1 records a log (step S350). A log is recorded only in the case of an important document, and therefore the storage amount of the log data can be reduced.

Similarly, when the important document report is received, the log recording unit 35 of the MFP 2 records a log (step S380). A log is recorded only in the case of an important document, and therefore the storage amount of the log data can be reduced. Furthermore, both the MFP 1 and the MFP 2 record a log, and therefore the level of security is increased.

When printing of the allocated page number is completed, the job management module 17 of the MFP 2 sends the print execution result to the communication management module 15 (step S390). The communication management module 15 sends the print execution result to the communication management module 15 of the MFP 1 (step S400). The communication management module 15 of the MFP 1 sends the print execution result to the job management module 17 (step S410).

The job management module 17 of the MFP 1 waits for the printing of the device itself to end, and sends the job execution result to the copy application (step S420).

As described above, in the device cooperation system 200 according to the present embodiment, only when the original document that is the processing target is an important document, the MFPs 1, 2 record a log, and therefore the storage amount of the log can be reduced.

In FIGS. 19A through 19C, a copy application is taken as an example; however, in the case of a printer application or a fax application also, a log is recorded only when the document is an important document. Similarly, in the following embodiments, the method of recording a log is also applicable to a printer application or a fax application.

Second Embodiment

In the first embodiment, only the MFP 1 determines whether a document is an important document. In a second embodiment, a description is given of the device cooperation system 200 in which the MFP 2 also independently determines whether the document is an important document. The MFP 1 and the MFP 2 separately determine whether a document is an important document, and therefore it is possible to reduce missing recordings in a log.

Figure 20A:
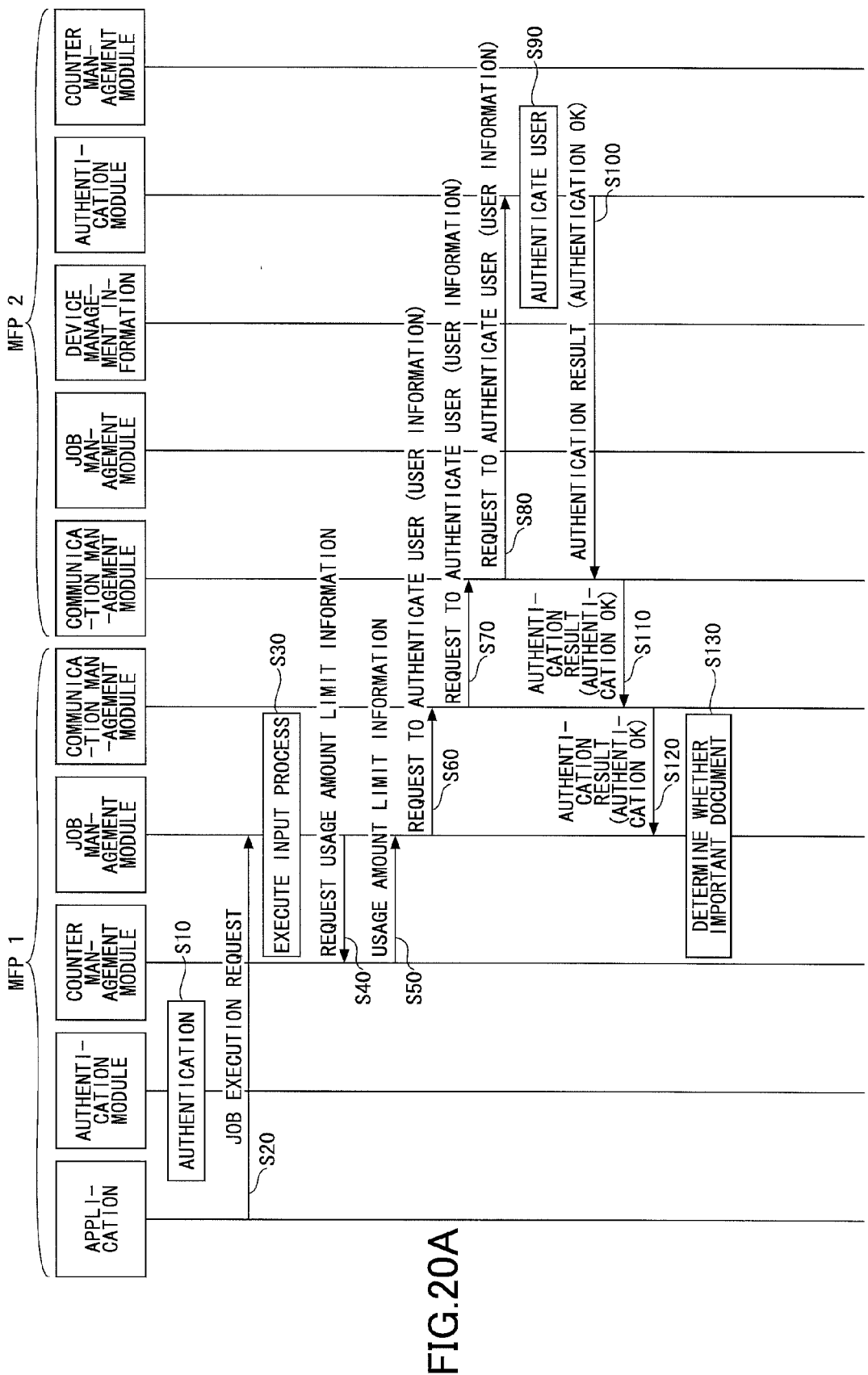
FIGS. 20A through 20C show a sequence diagram illustrating procedures of executing a device cooperation job performed by the MFP 1 and the MFP 2 (second embodiment)
Figure 20B:
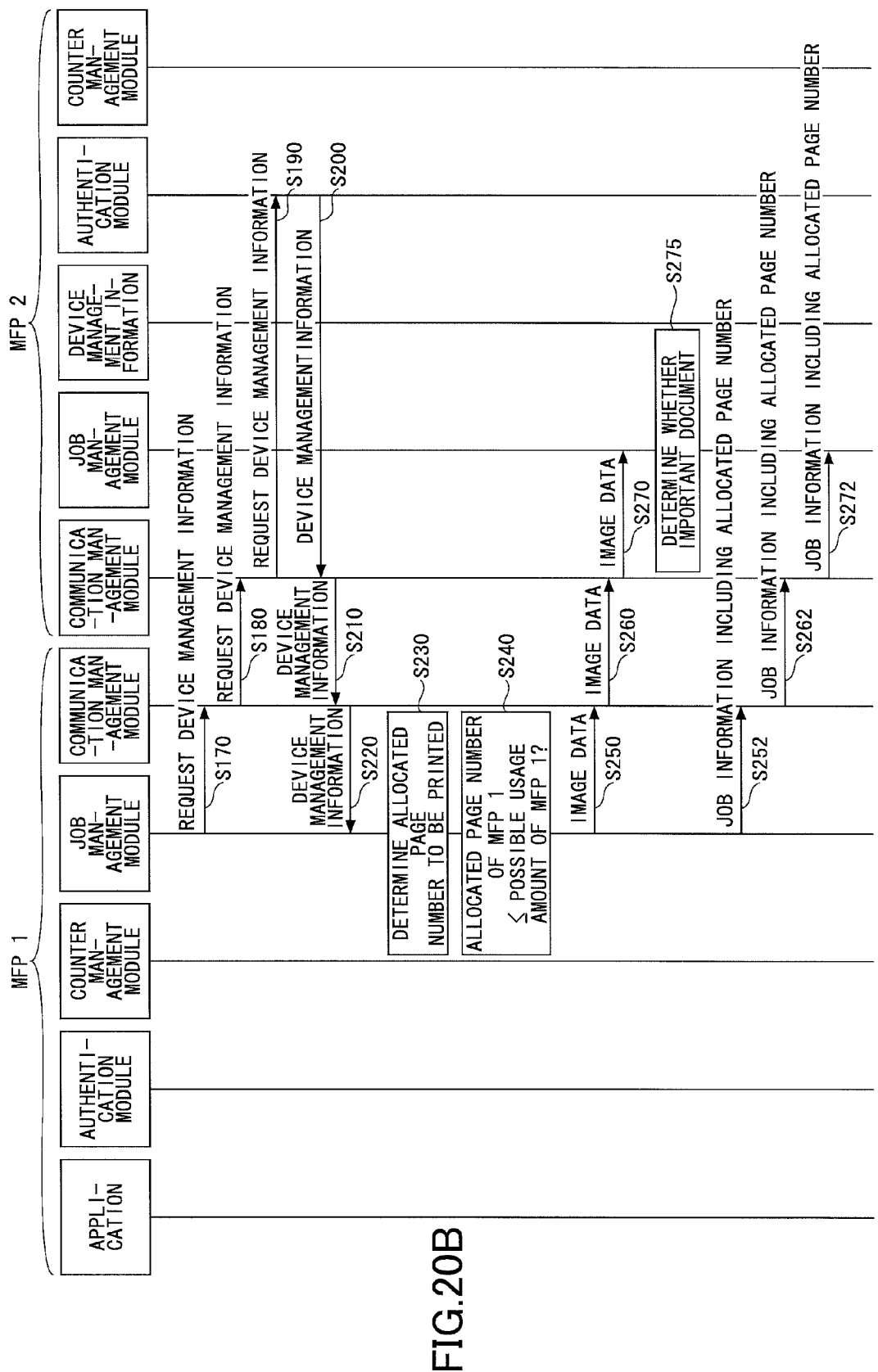
Figure 20C:
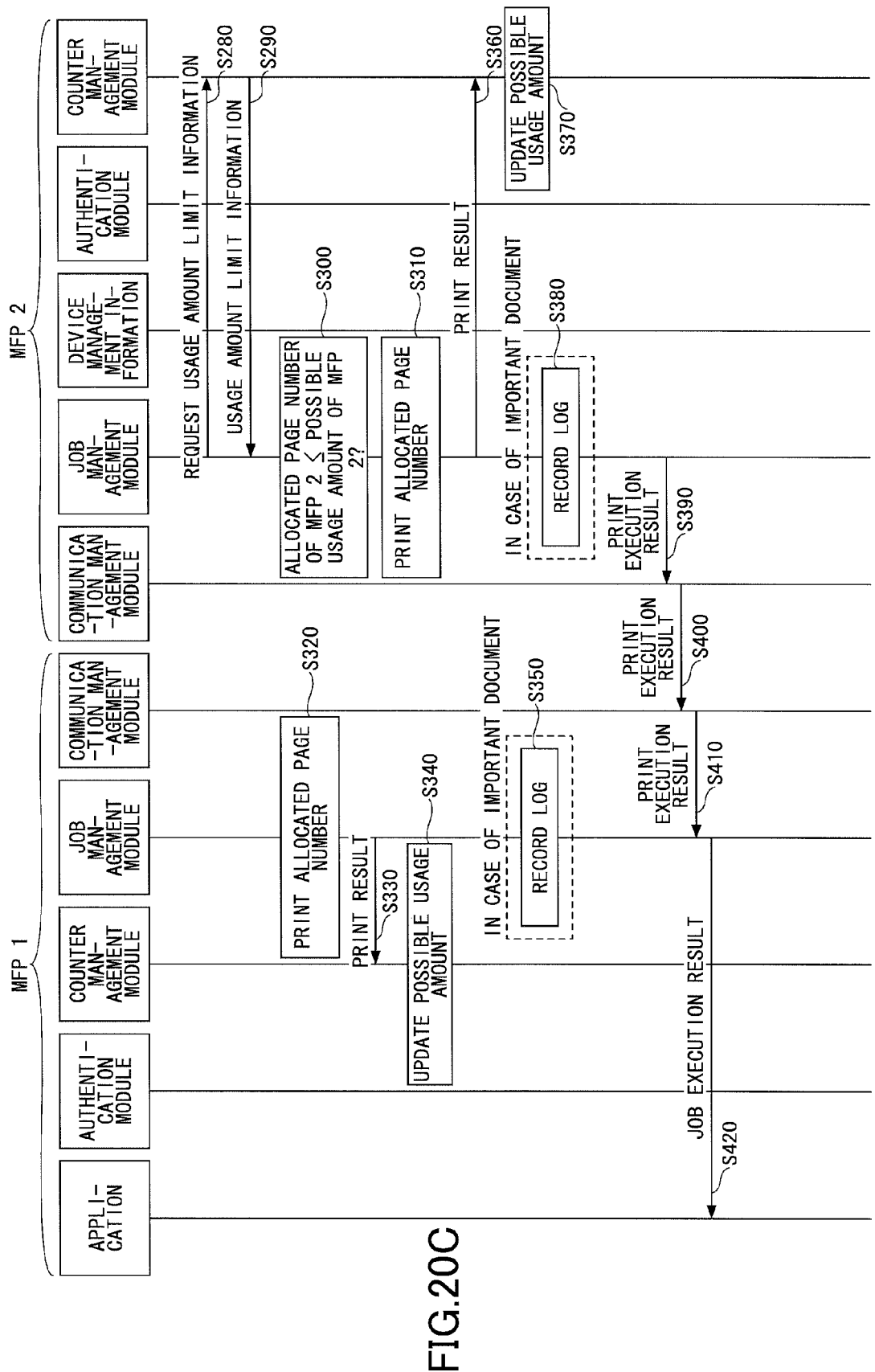

FIGS. 20A through 20C show a sequence diagram illustrating procedures of executing a device cooperation job performed by the MFP 1 and the MFP 2. In FIGS. 20A through 20C, the processes up to step S130 are the same as those of FIGS. 19A through 19C.

In step S130, the important document determination unit 36 determines whether the document is an important document. However, in the present embodiment, the MFP 2 uniquely determines whether the document is an important document, and therefore the MFP 1 does not need to send an important document report to the MFP 2.

Meanwhile, after the MFP 2 receives the image data, the MFP 2 can determine whether the document is an important document. In FIGS. 20A through 20C, in step S272, the job management module 17 receives the image data. Accordingly, the important document determination unit 36 determines whether the document is an important document (step S275).

Subsequent processes are the same as those of the first embodiment. That is to say, when the MFP 2 determines that the document is an important document, in step S380, the log recording unit 35 of the MFP 2 records a log.

Furthermore, when the MFP 1 determines that the document is an important document in step S130, in step S350, the log recording unit 35 of the MFP 1 records a log.

Accordingly, a log is recorded only when the document is an important document, and therefore the log data storage amount can be reduced. Furthermore, both the MFP 1 and the MFP 2 record a log, and therefore security can be improved. Furthermore, the MFP 1 and the MFP 2 can determine whether a document is an important document based on separate determination standards, and therefore a log can be recorded from various viewpoints.

Third Embodiment

When a user takes a copy of an important document by device cooperation, the important document flows through the network, and part of the process is executed by an MFP that is not an operation target. In this case, the level of security may decline. Therefore, in a third embodiment, a description is given of the device cooperation system 200 in which the device cooperation job is cancelled when a document is determined as being an important document.

Figure 21:
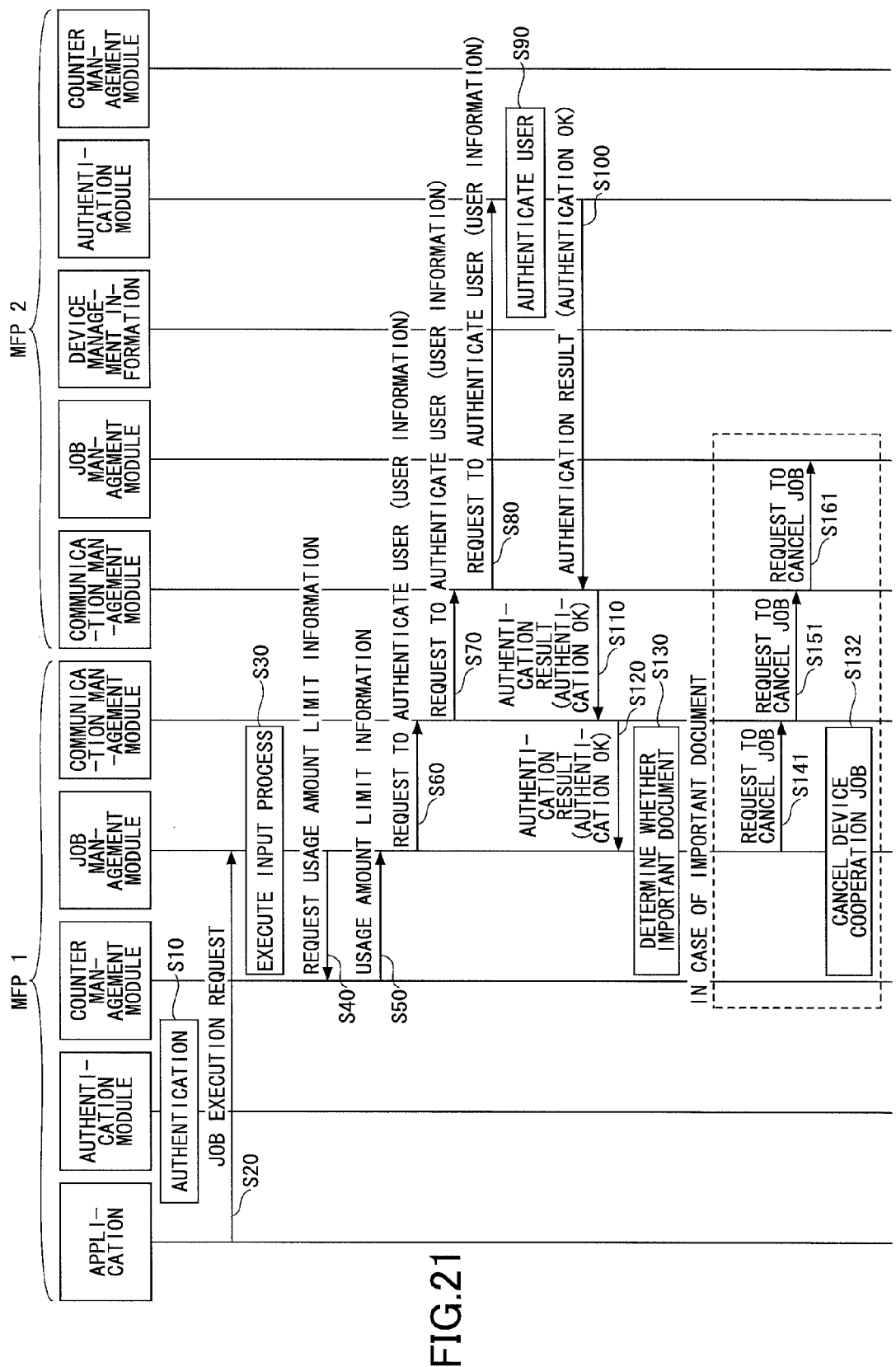
FIG. 21 is a sequence diagram illustrating procedures of executing a device cooperation job performed by the MFP 1 and the MFP 2 (third embodiment)

FIG. 21 is a sequence diagram illustrating procedures of executing a device cooperation job performed by the MFP 1 and the MFP 2. In FIG. 21, the processes up to step S130 are the same as those of FIGS. 19A through 19C.

In step S130, the important document determination unit 36 determines whether the document is an important document. The determination of an important document may be made after acquiring the image data and before sending the image data. When the document is determined as being an important document, the job management module 17 of the MFP 1 reports to the MFP 2 that the job is to be cancelled, instead of sending an important document report (steps S141 through S161).

When the document is determined to be an important document, the job management module 17 of the MFP 1 cancels the device cooperation job (step S132). Accordingly, the image data is not sent to the MFP 2, and therefore the level of security is prevented from declining.

Furthermore, the MFP 1 displays an error message on the operations panel 130. Accordingly, the user recognizes the reason why the job is cancelled, and takes a copy with only the MFP 1.

Fourth Embodiment

In the third embodiment, the device cooperation job is cancelled; however, if the job is executed by the MFP 1 operated by the user, the level of security can be prevented from declining. Accordingly, in a fourth embodiment, a description is given of the device cooperation system 200 in which only the MFP 1 executes the device cooperation job when the document is determined to be an important document.

Figure 22A:
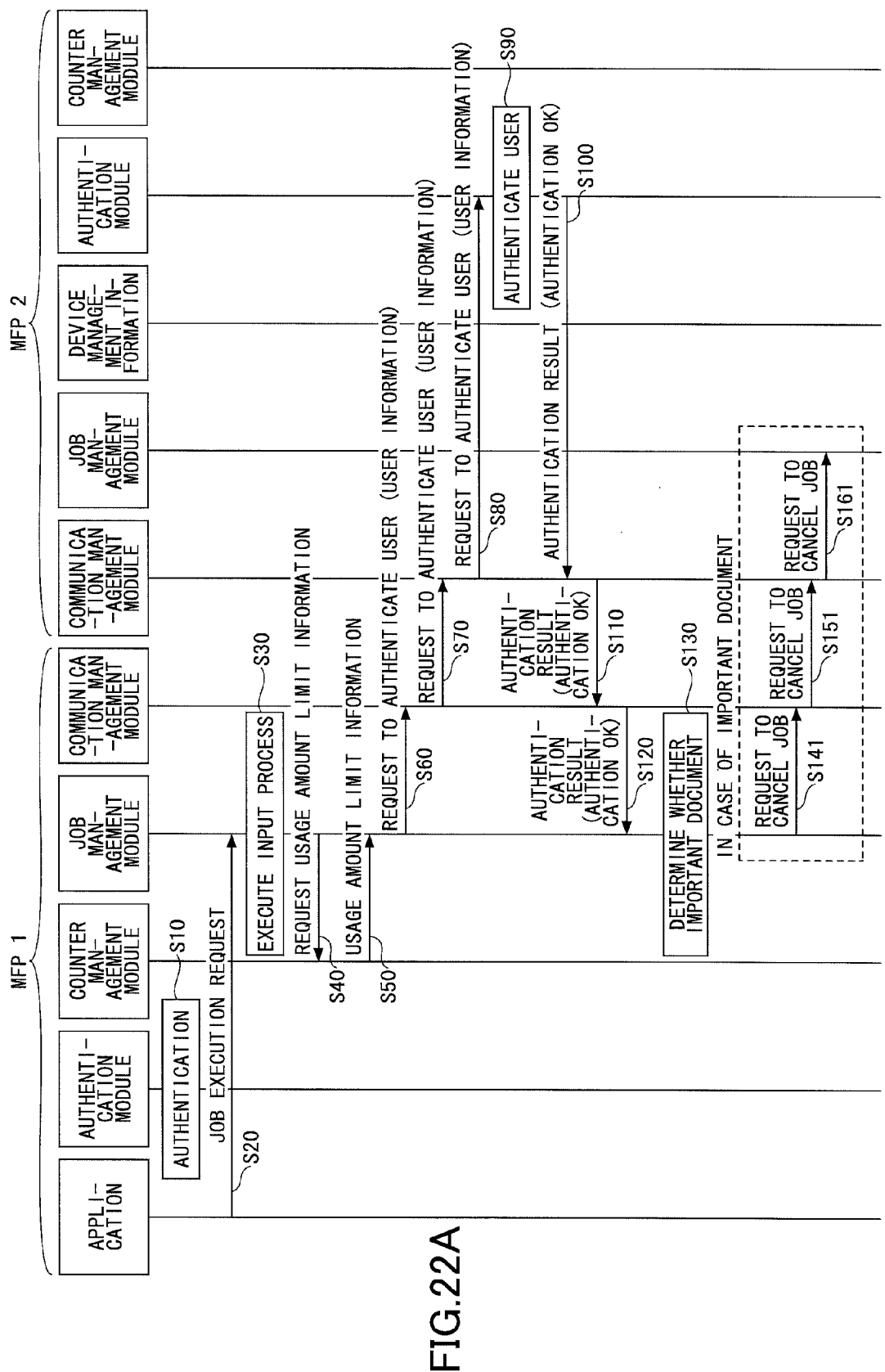
FIGS. 22A and 22B show a sequence diagram illustrating procedures of executing a device cooperation job performed by the MFP 1 and the MFP 2 (fourth embodiment)
Figure 22B:
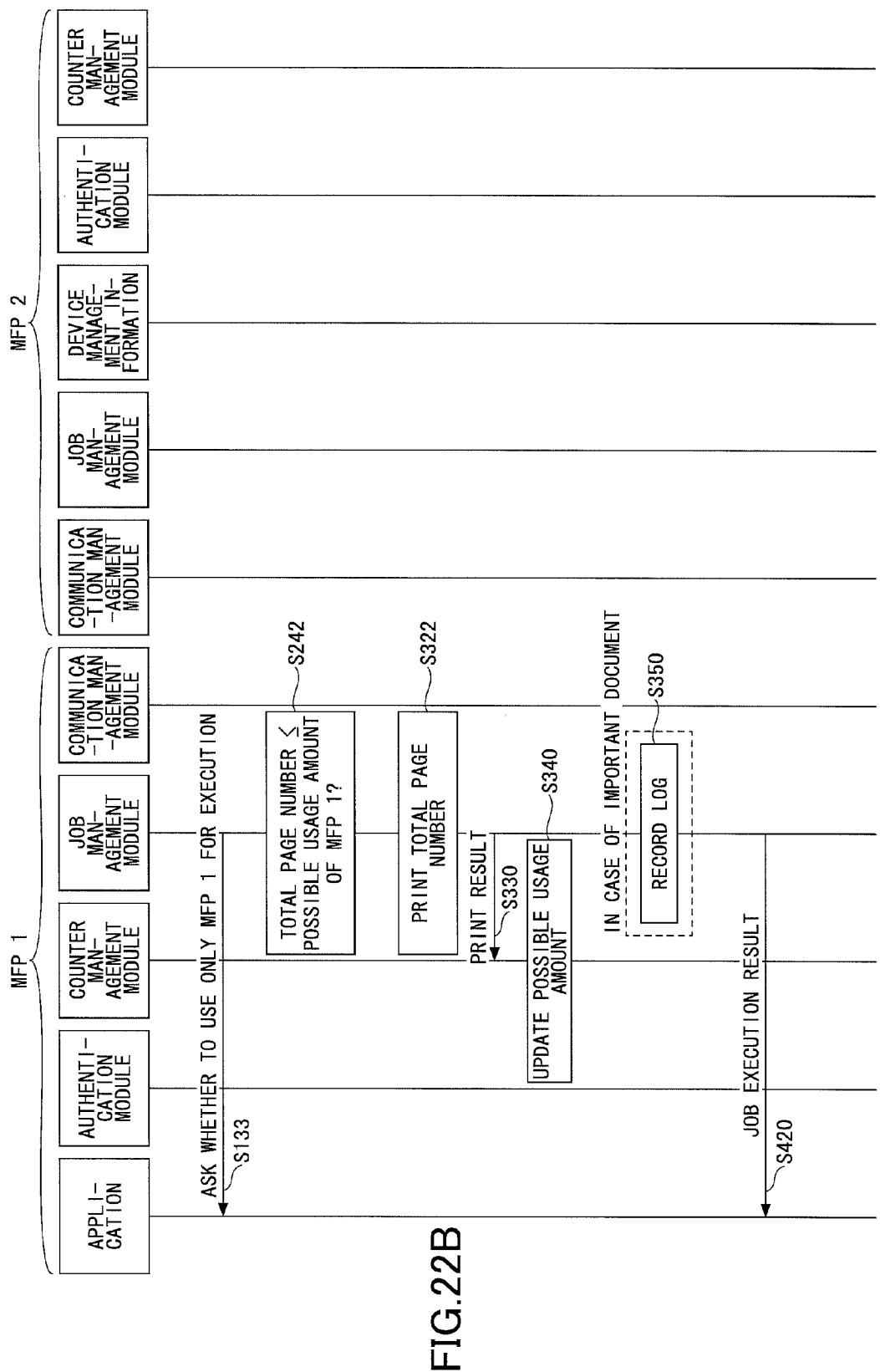

FIGS. 22A and 22B show a sequence diagram illustrating procedures of executing a device cooperation job performed by the MFP 1 and the MFP 2. In FIGS. 22A and 22B, the processes up to step S161 are the same as those of FIG. 21.

When the MFP 1 determines that the document is an important document, the job management module 17 of the MFP 1 reports to the MFP 2 that the job is to be cancelled, instead of sending an important document report (steps S141 through S161). Thus, the image data is not sent to the MFP 2.

Then, the job management module 17 displays an error message on the display unit, and asks the user whether to use only the MFP 1 to execute the device cooperation job (step S133). For example, the following message is displayed on the display unit. "The document is determined to be an important document, and therefore the job cannot be executed in cooperation with another device.
Print all pages with this device? Please select YES or NO".

When the user selects NO, the job management module 17 cancels the device cooperation job as in the third embodiment.

When the user selects YES, the job management module 17 executes the device cooperation job by the MFP 1 alone. The execution conditions are set in the print setting screen of FIGS. 14A through 14C. If the user has selected common settings, the printing performed at the MFP 2 can be performed at the MFP 1.

Meanwhile, the user may have selected separate settings. In this case, a process that can be performed only by the MFP 2 may be set, and therefore even if the user has selected YES, the job management module 17 cancels the device cooperation job. Furthermore, the job management module 17 determines whether the job includes a process that is difficult for the MFP 1 to perform, by comparing the job information of the MFP 2 and the device management information of the MFP 1, and may present the difference to the user. The user may determine whether the printing can be performed at the MFP 1 based on the difference.

When the device cooperation job can be executed by the MFP 1 alone, the MFP 1 executes the device cooperation job. The job management module 17 does not determine the allocated page number, and the usage amount determining unit 32 of the job management module 17 determines whether the total number of pages is less than or equal to the possible usage amount of the MFP 1 (step S242).

When the total number of pages is less than or equal to the possible usage amount of the MFP 1, the job management module 17 of the MFP 1 collaborates with the resource management module 14 and the engine management module 16 to print the total page number (step S322). The job management module 17 reports the print results in units of output to the counter management module 19 (step S330). The counter management module 19 updates (subtracts) the possible usage amount of the MFP 1 in units of output (step S340).

When it is determined that the document is an important document at step S130, the log recording unit 35 of the MFP 1 records a log (step S350). The log is recorded only when the document is an important document, and therefore the storage amount of the log data can be reduced. In this case, in the log data, the "job execution result" is OK but the "execution result" of device cooperation is NG. Furthermore, in the log data of the MFP 1, it is preferably registered that the device cooperation has been cancelled because the document has been determined as being an important document.

According to the present embodiment, when the document is determined as an important document, the image data is not transmitted, and therefore the level of security is prevented form declining, and the MFP 1 can print the entire document.

Fifth Embodiment

In the fourth embodiment, the MFP 1 determines to cancel the execution of a device cooperation job, but the same effects can be attained in a case where the MFP 2 makes a rejection.

Figure 23A:
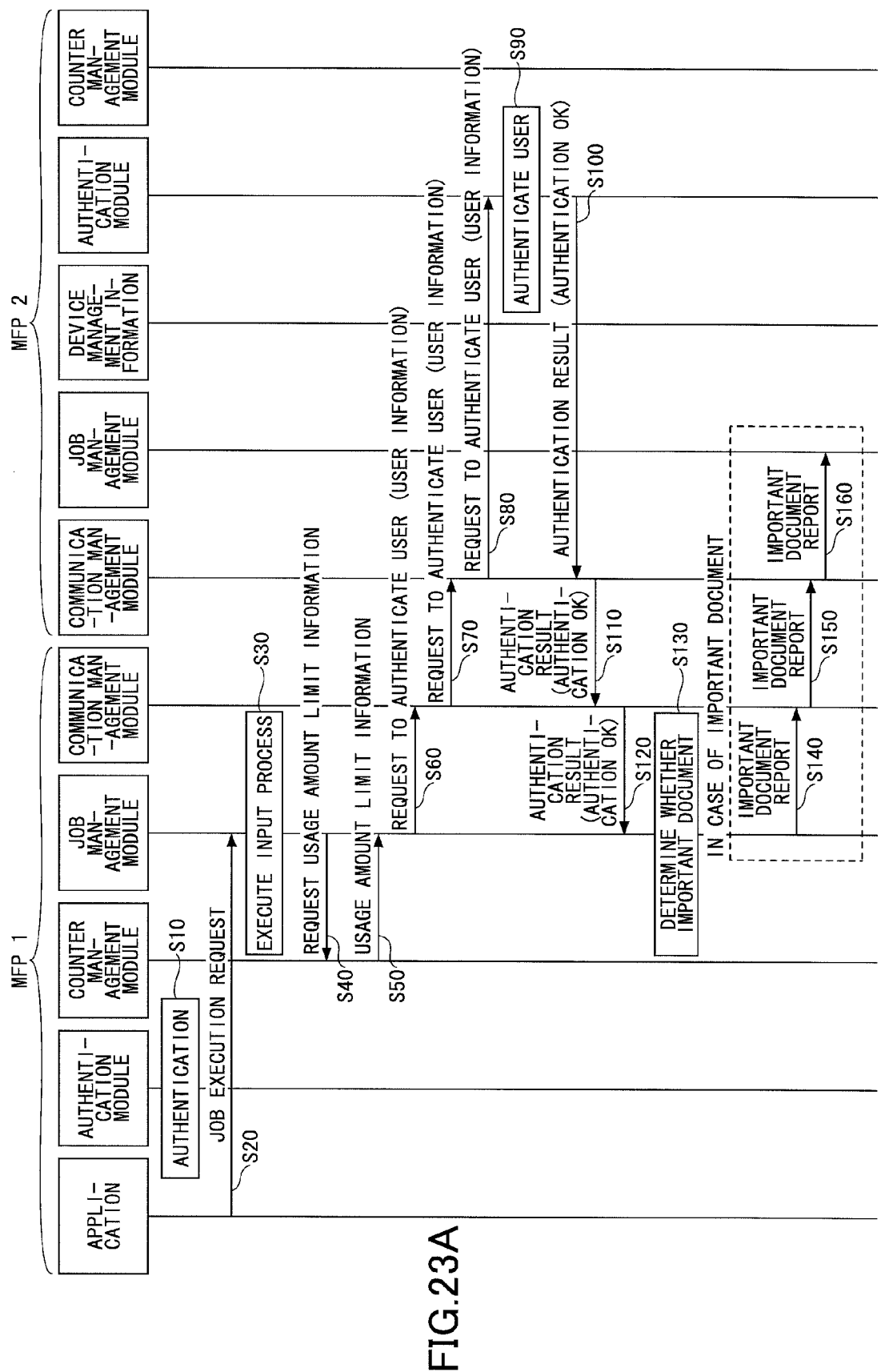
FIGS. 23A and 23B show a sequence diagram illustrating procedures of executing a device cooperation job performed by the MFP 1 and the MFP 2 (fifth embodiment)
Figure 23B:
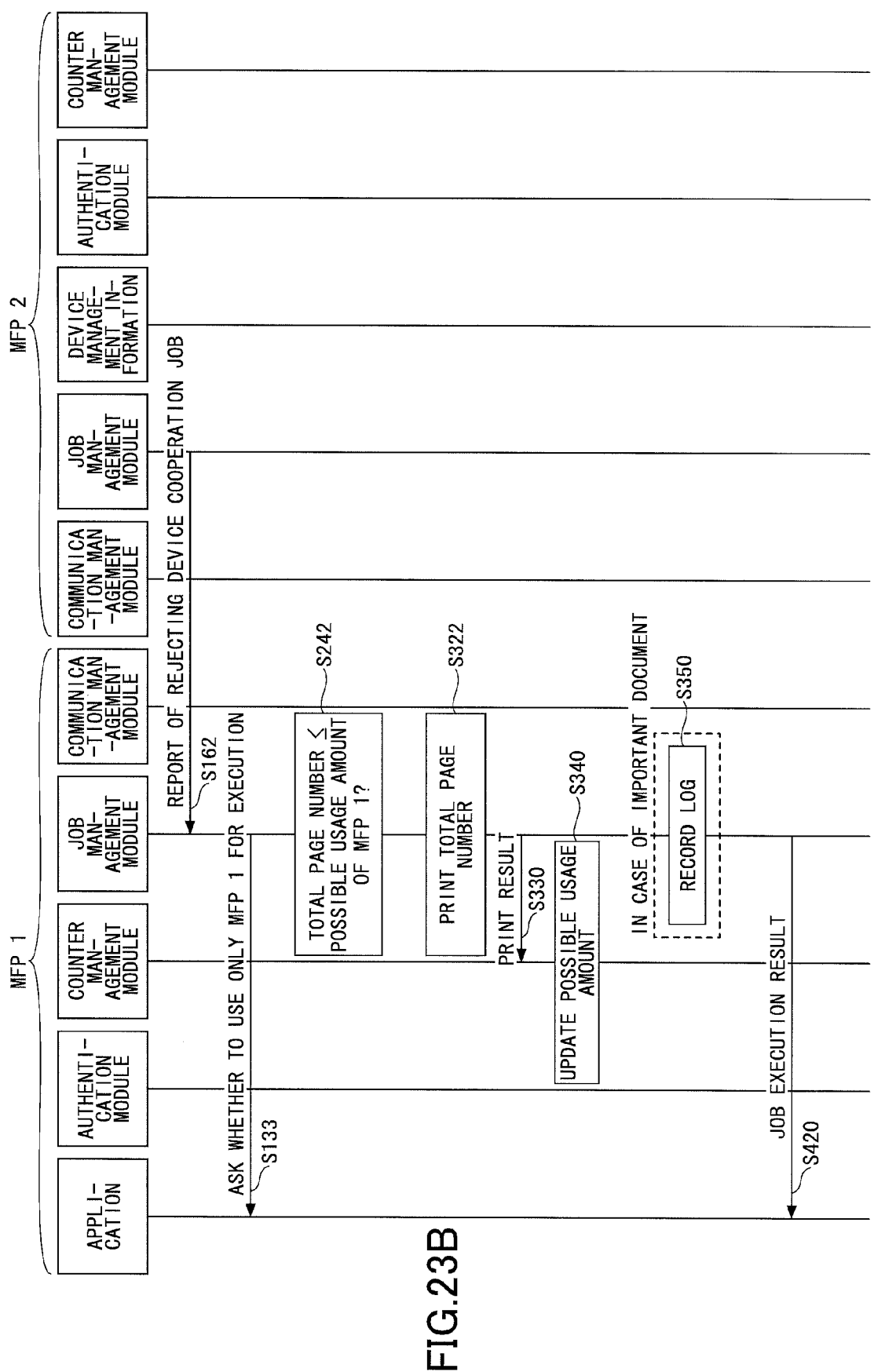

FIGS. 23A and 23B show a sequence diagram illustrating procedures of executing a device cooperation job performed by the MFP 1 and the MFP 2. In FIGS. 23A and 23B, the processes up to step S130 are the same as those of FIGS. 19A through 19C.

In step S130, the important document determination unit 36 determines whether the document is an important document. The determination of an important document may be made after acquiring the image data and before sending the image data. When the document is determined as being an important document, the job management module 17 of the MFP 1 sends an important document report to the MFP 2 (steps S140 through S160).

In response to the important document report, the job management module 17 of the MFP 2 sends a report of rejecting the device cooperation job to the MFP 1 (step S162).

Accordingly, the job management module 17 of the MFP 1 detects that the job cannot be executed by device cooperation with the MFP 2. The subsequent procedures are the same as those of the fourth embodiment.

According to the present embodiment, when the document is determined to be an important document, even if the MFP 1 attempts to continue the device cooperation job, the MFP 2 can reject this, and therefore the level of security is prevented from declining, and the MFP 1 can print the entire document.

Sixth Embodiment

In the third to fifth embodiments, the MFP 1 is prevented from sending the image data when the original document is an important document, but in any case, the MFP 1 determines whether a document is an important document. In the present sixth embodiment, a description is given of the device cooperation system 200 in which when the MFP 2 determines that a document is an important document, the execution of the device cooperation job can be cancelled.

Figure 24A:
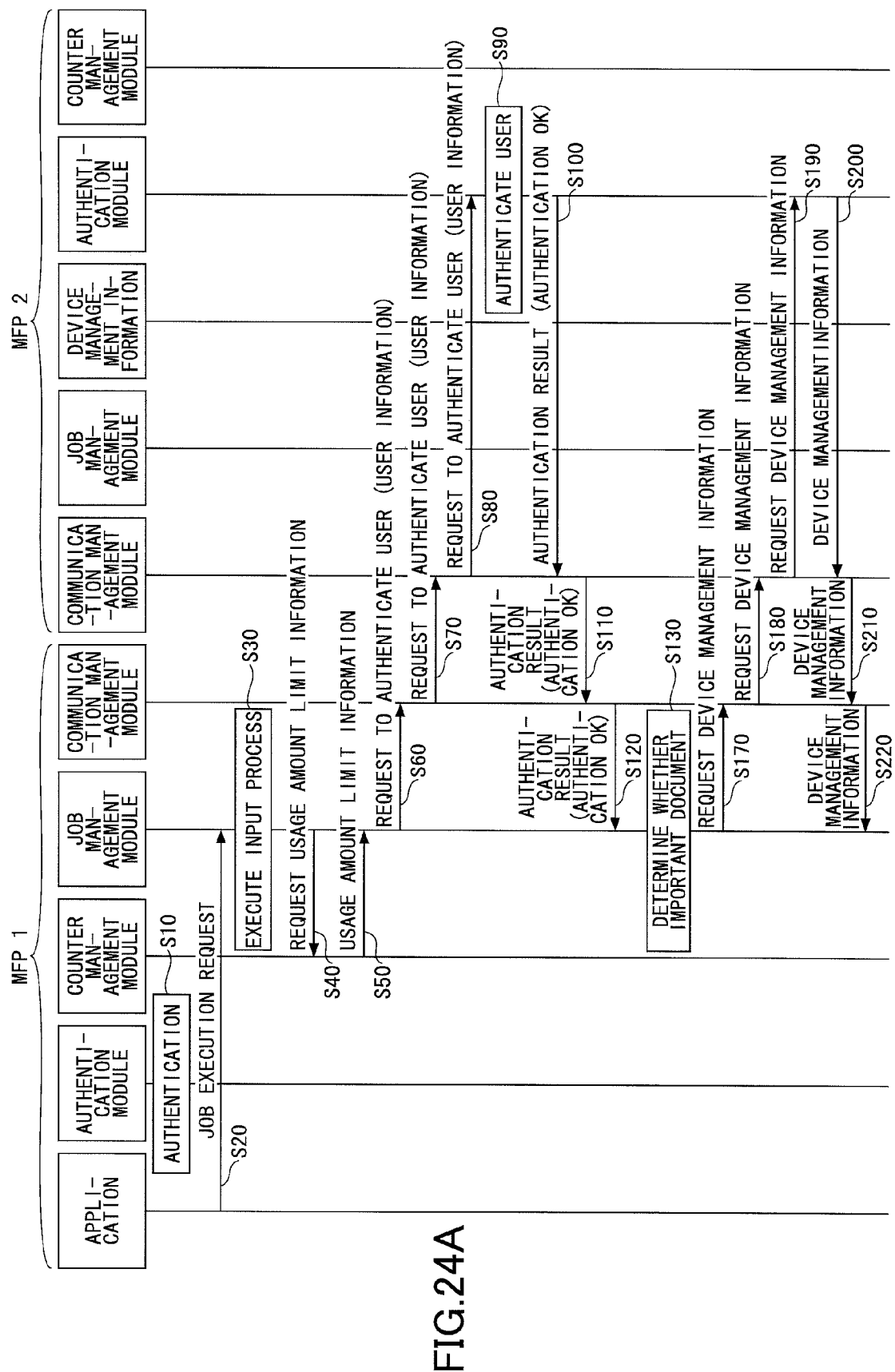
FIGS. 24A through 24C show a sequence diagram illustrating procedures of executing a device cooperation job performed by the MFP 1 and the MFP 2 (sixth embodiment).
Figure 24B:
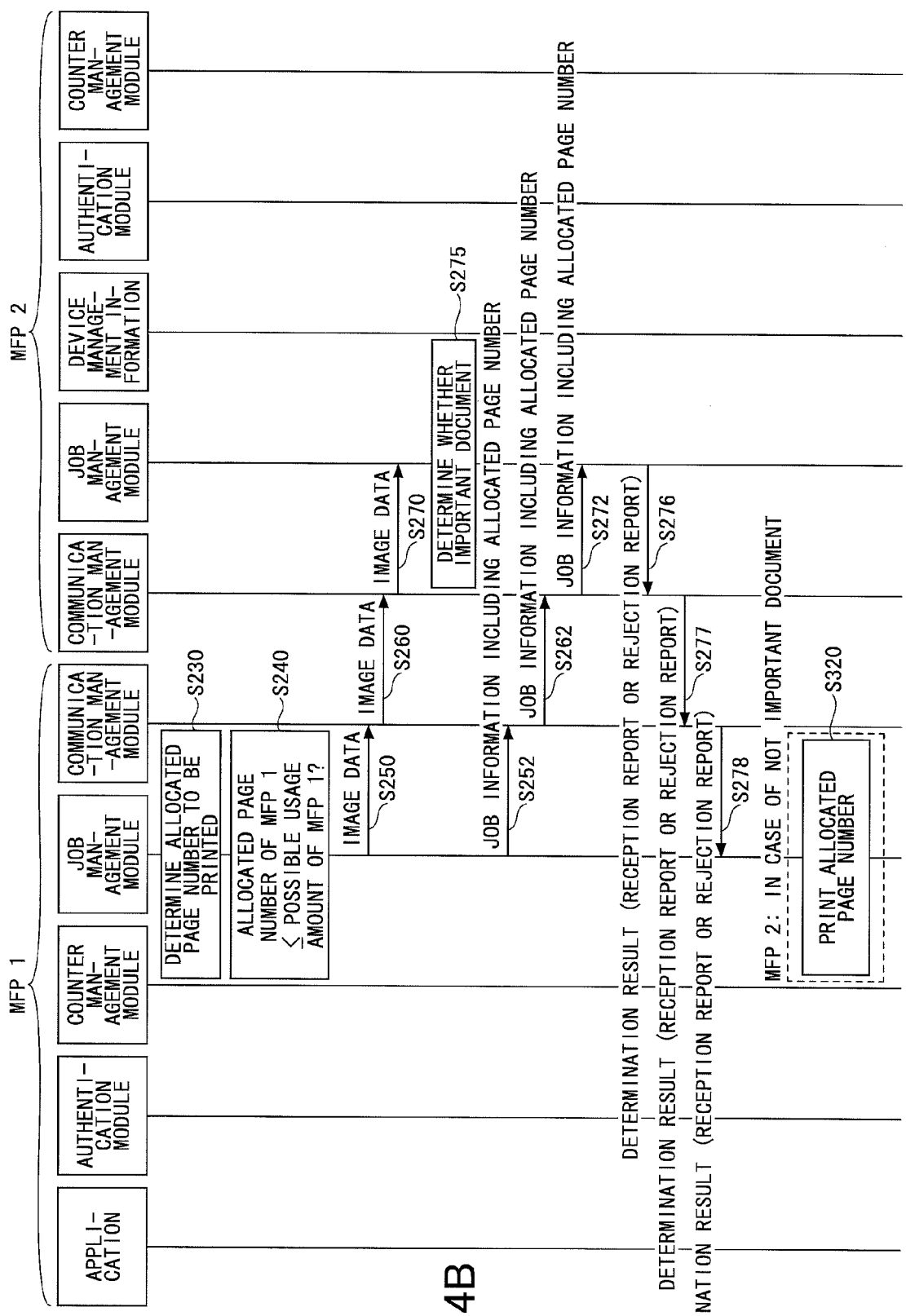
Figure 24C:
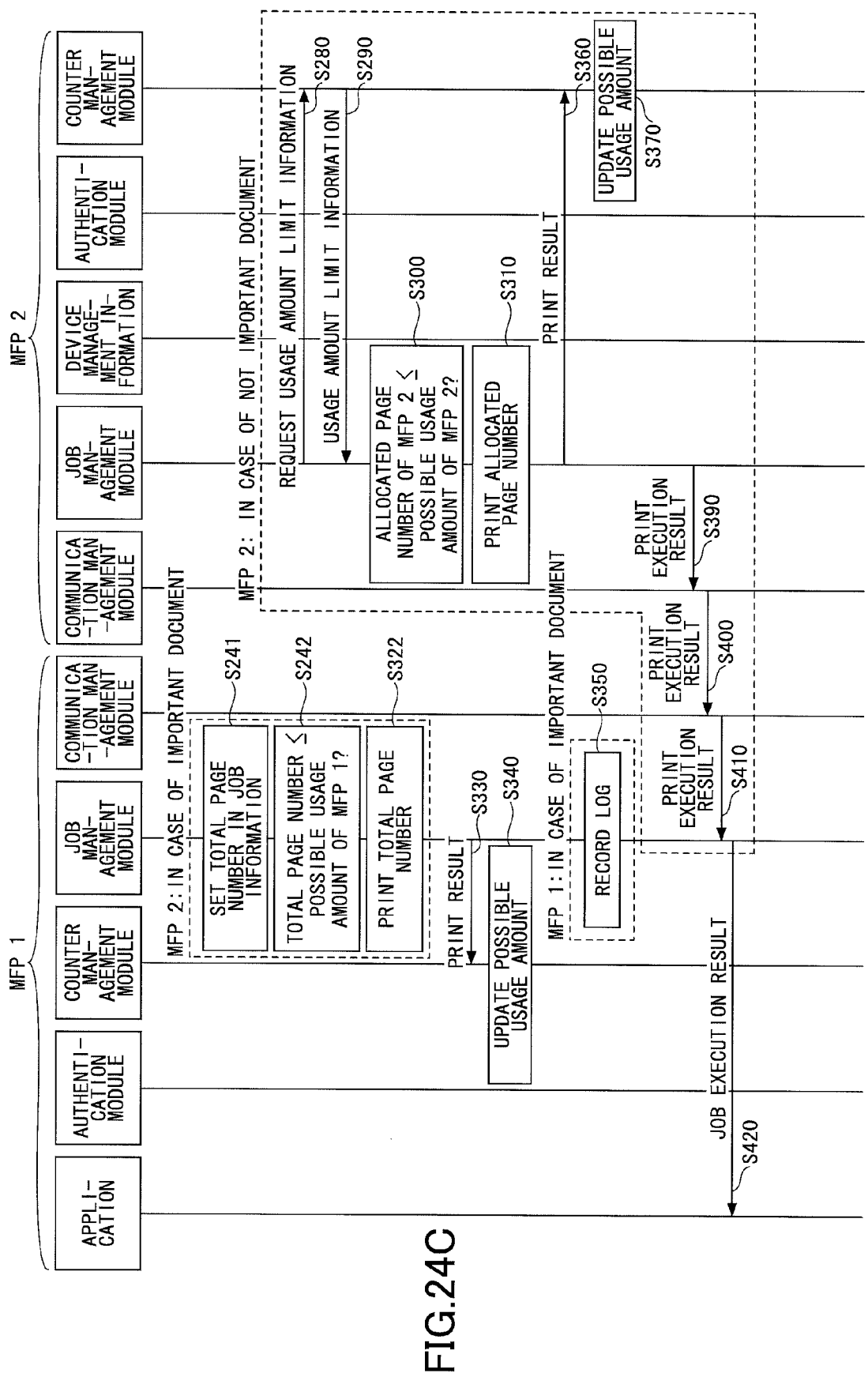

FIGS. 24A through 24C show a sequence diagram illustrating procedures of executing a device cooperation job performed by the MFP 1 and the MFP 2. In FIGS. 24A through 24C, the processes up to step S275 are the same as those of FIGS. 20A through 20C.

After receiving the image data, the MFP 2 determines whether the document is an important document. In FIGS. 24A through 24C, at step S270, the job management module 17 of the MFP 2 receives the image data. Accordingly, the important document determination unit 36 can determine whether the document is an important document.

When the MFP 2 determines that the document is an important document by itself, the job management module 17 of the MFP 2 sends the determination result of the device cooperation job to the MFP 1 (step S276). The communication management module 15 of the MFP 2 sends the determination result to the communication management module 15 of the MFP (step S277). The communication management module 15 of the MFP 1 sends the determination result of the MFP 2 to the job management module 17 (step S278). The determination result includes a reception report or a rejection report.

The MFP 2 continues the process as follows.
(i) When the MFP 2 determines that the document is an important document by itself, the MFP 2 cancels the device cooperation job. The MFP 2 has already received the image data even if the job is cancelled at this point, but because the MFP 2 has not printed the image data, the image data is not turned into a visible document, and therefore security is maintained.
(ii) When the MFP 2 determines that the document is not an important document by itself, the MFP 2 prints the document by executing the process from step S280 onward. Even if the device cooperation job is executed, the log recording unit 35 of the MFP 2 does not record a log.

The MFP 1 continues the process as follows.
(i) When the MFP 1 receives the determination result (rejection report), similar to the fifth embodiment, the MFP 1 determines whether the MFP 1 can execute the device cooperation job alone. When the device cooperation job can be executed alone, the MFP 1 sets the total number of pages in the job information, instead of the allocated page number (step S241).

The usage amount determining unit 32 of the job management module 17 determines whether the total number of pages is less than or equal to the possible usage amount of the MFP 1 (step S242).

When the total number of pages is less than or equal to the possible usage amount of the MFP 1, the job management module 17 of the MFP 1 collaborates with the resource management module 14 and the engine management module 16 to print the total number of pages (step S322). The job management module 17 reports the print results in units of output to the counter management module 19 (step S330). The counter management module 19 updates (subtracts) the possible usage amount of the MFP 1 in units of output (step S340).

The log recording unit 35 of the MFP 1 records a log depending on the result of step S130, where the MFP 1 determines whether the document is an important document.
(ii) When the MFP 1 receives a determination result (reception report), the MFP 1 prints the allocated page number, similar to the fifth embodiment.

The job management module 17 of the MFP 1 collaborates with the resource management module 14 and the engine management module 16 to print the allocated page number (step S320). The job management module 17 reports the print results in units of output to the counter management module 19 (step S330). The counter management module 19 updates (subtracts) the possible usage amount of the MFP 1 in units of output (step S340).

The log recording unit 35 of the MFP 1 records a log depending on the result of step S130, where the MFP 1 determines whether the document is an important document.

According to the present embodiment, the MFP 1 and the MFP 2 can respectively determine whether the document is an important document, and therefore security is easily maintained.

Furthermore, the present embodiment may be combined with the fifth embodiment. In this case, when either the MFP 1 or the MFP 2 determines that the document is an important document, the device cooperation job is canceled, and therefore the level of security can be further increased.

According to one embodiment of the present invention, a device cooperation system, an image forming apparatus, and a function providing method are provided, in which the recorded log can be reduced.

The device cooperation system, the image forming apparatus, and the function providing method are not limited to the specific embodiments described herein, and variations and modifications may be made without departing from the scope of the present invention.

The present application is based on Japanese Priority Patent Application No. 2011-194976, filed on Sep. 7, 2011, the entire contents of which are hereby incorporated herein by reference.

What is claimed is:
1. A device cooperation system, comprising:
plural devices connected via a network, in which the plural devices take partial charge of providing functions necessary for a single job constituted by a series of processes starting from input to output, wherein
a first device includes:
an acquiring unit configured to acquire image data that is an output target,
an output condition receiving unit configured to receive a first output condition used by the first device and a second output condition used by an at least one second device when outputting the image data,
a first important document determining unit configured to determine whether first important information determined in advance is included in the image data,
a first operation control unit configured to control an output operation of the first device based on the first output condition and send an output request to the at least one second device,
a first output unit configured to output an output object according to the first output condition of the first device,
a first operation information recording unit configured to record operation information of the first output unit when the first important document determining unit determines that the first important information is included in the image data, and
a data communication unit configured to send, to the at least one second device, the image data, a determination result indicating whether the first important information is included in the image data, and the second output condition of the at least one second device, and
the at least one second device includes:
a second operation control unit configured to control an output operation of the at least one second device in response to receiving the output request from the first device,
a second output unit configured to output an output object according to the second output condition of the at least one second device, and a second operation information recording unit configured to record operation information of the second output unit when the determination result indicating that the first important information is included in the image data is acquired from the first device.

2. The device cooperation system according to claim 1, wherein
the data communication unit does not send the determination result indicating whether the first important information is included in the image data, and sends, to the at least one second device, the image data and the second output condition of the at least one second device,
the at least one second device includes a second important document determining unit configured to determine whether second important information determined in advance is included in the image data, and
the second operation information recording unit records the operation information of the second output unit when the second important document determining unit determines that the second important information is included in the image data.

3. The device cooperation system according to claim 1, wherein
when the first important document determining unit determines that the first important information is included in the image data,
the first operation control unit cancels the output operation of the first device and cancels sending the output request to the at least one second device, before the image data is sent to the at least one second device.

4. The device cooperation system according to claim 1, wherein
when the first important document determining unit determines that the first important information is included in the image data,
the first operation control unit cancels sending the output request to the at least one second device, and outputs the output object from the first output unit, the output object being obtained by adding an output number included in the first output condition of the first device and an output number included in the second output condition of the at least one second device.

5. The device cooperation system according to claim 1, wherein
when the determination result indicating that the first important information is included in the image data is acquired from the first device, the second operation control unit rejects to output the image data from the second output unit even when the output request is received from the first device, and
the first operation control unit outputs the output object from the first output unit, the output object being obtained by adding an output number included in the first output condition of the first device and an output number included in the second output condition of the at least one second device.

6. The device cooperation system according to claim 1, wherein
the data communication unit does not send the determination result indicating whether the first important information is included in the image data, and sends, to the at least one second device, the image data and the second output condition of the at least one second device,
the at least one second device includes a second important document determining unit configured to determine whether second important information determined in advance is included in the image data,
when the second important document determining unit determines that the image data includes the second important information, the second operation control unit cancels sending the output of the image data from the second output unit, and
the first operation control unit outputs the output object from the first output unit, the output object being obtained by adding an output number included in the first output condition of the first device and an output number included in the second output condition of the at least one second device.

7. The device cooperation system according to claim 1, wherein
the first device receives registration of the first important information.

8. The device cooperation system according to claim 1, wherein
the acquiring unit is a scanner device that takes an image of an original document to acquire the image data, or a data communication device that acquires the image data from a terminal.

9. The device cooperation system according to claim 8, wherein
both of the first output unit and the second output unit are printing devices that form an image on at least one of a recording medium and a fax transmission device that transmits the image data via a telephone line or an IP network.

10. An image forming apparatus connected to a device via a network, the device including
a second operation control unit configured to control an output operation in response to receiving an output request from the image forming apparatus,
a second output unit configured to output an output object according to a second output condition, and
a second operation information recording unit configured to record operation information of the second output unit when a determination result indicating that first important information is included in image data is acquired from the image forming apparatus, the image forming apparatus comprising:
an acquiring unit configured to acquire the image data that is an output target;
an output condition receiving unit configured to receive a first output condition used by the image forming apparatus and the second output condition used by the device when outputting the image data;
a first important document determining unit configured to determine whether the first important information determined in advance is included in the image data;
a first operation control unit configured to control an output operation of the image forming apparatus based on the first output condition and send an output request to the device;
a first output unit configured to output an output object according to the first output condition;
a first operation information recording unit configured to record operation information of the first output unit when the first important document determining unit determines that the first important information is included in the image data; and
a data communication unit configured to send, to the device, the image data, a determination result indicating whether the first important information is included in the image data, and the second output condition of the device.

11. A function providing method by which plural devices connected via a network take partial charge of providing functions necessary for a single job constituted by a series of processes starting from input to output, the function providing method comprising:
- acquiring image data that is an output target, performed by an acquiring unit of a first device;
- receiving a first output condition used by the first device and a second output condition used by an at least one second device when outputting the image data, performed by an output condition receiving unit of the first device;
- determining whether first important information determined in advance is included in the image data, performed by a first important document determining unit of the first device;
- controlling an output operation of the first device based on the first output condition and sending an output request to the at least one second device, performed by a first operation control unit of the first device;
- outputting an output object according to the first output condition of the first device, performed by a first output unit of the first device;
- recording operation information of the first output unit when the first important document determining unit determines that the first important information is included in the image data, performed by a first operation information recording unit of the first device;
- sending, to the at least one second device, the image data, a determination result indicating whether the first important information is included in the image data, and the second output condition of the at least one second device, performed by a data communication unit of the first device;
- controlling an output operation of the at least one second device in response to receiving the output request from the first device, performed by a second operation control unit of the at least one second device;
- outputting an output object according to the second output condition of the at least one second device, performed by a second output unit of the at least one second device; and
- recording operation information of the second output unit when the determination result indicating that the first important information is included in the image data is acquired from the first device, performed by a second operation information recording unit of the at least one second device.

* * * * *